United States Patent [19]

Murata

[11] Patent Number: 4,831,557
[45] Date of Patent: May 16, 1989

[54] IMAGE COMPOSING APPARATUS
[75] Inventor: Hiroyuki Murata, Tokyo, Japan
[73] Assignee: Namco Ltd., Tokyo, Japan
[21] Appl. No.: 30,703
[22] Filed: Mar. 25, 1987
[30] Foreign Application Priority Data
  Mar. 31, 1986 [JP] Japan ................................. 61-73162
[51] Int. Cl.[4] .............................................. G09G 1/16
[52] U.S. Cl. .................................. 364/521; 340/729; 340/747; 364/518
[58] Field of Search ............................... 364/518–521; 340/723, 727, 729, 743, 747

[56] References Cited
U.S. PATENT DOCUMENTS

| 4,475,104 | 10/1984 | Shen | 340/729 |
| 4,481,594 | 11/1984 | Staggs et al. | 364/521 |
| 4,549,275 | 10/1985 | Swconick | 364/521 |
| 4,609,917 | 9/1986 | Shen | 340/729 |
| 4,697,178 | 9/1987 | Heckel | 340/729 |
| 4,725,831 | 2/1988 | Coleman | 340/747 |

Primary Examiner—Gary V. Harkcom
Assistant Examiner—H. R. Herndon
Attorney, Agent, or Firm—Koda and Androlia

[57] ABSTRACT

An image composing apparatus receiving contour point data of images from a source of image data. The apparatus includes a contour point data memory including horizontal scan memory areas respectively corresponding to horizontal scan lines, the horizontal scan memory areas storing contour point data sequentially written therein depending on their priorities. The contour point data includes pairs of left- and right-hand contour points at each of which the contour line of a given pattern for cathode ray tube display intersects each of the horizontal scan lines and attendant data of the pattern.

20 Claims, 38 Drawing Sheets

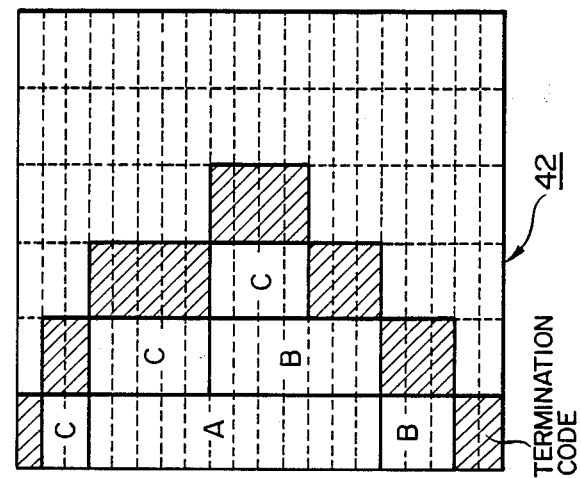
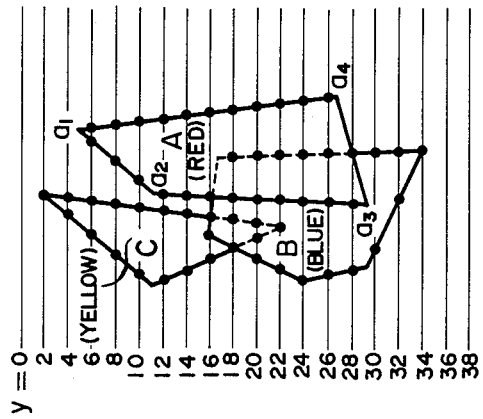
FIG. 4

FIG. 5

| INDEX MEMORY FORMAT | |
|---|---|
| ADDRESS (PRIORITY-NUMBER) | WRITE DATA (COLOR CODE) |
| 0 | RED |
| 1 | BLUE |
| 2 | YELLOW |

⎫
⎬ 64
⎭

8 BITS

| FIG.6A | FIG.6B |

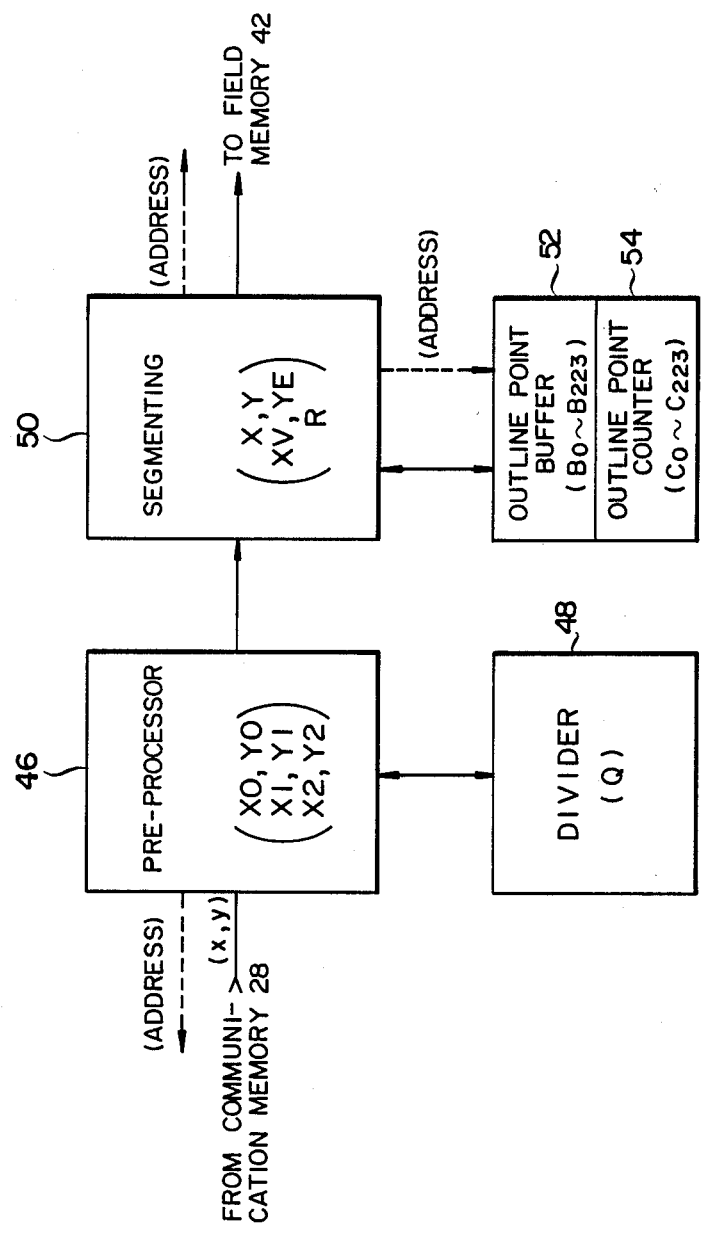

| FIG. 12A |
| FIG. 12B |

FIG. 14
(A)
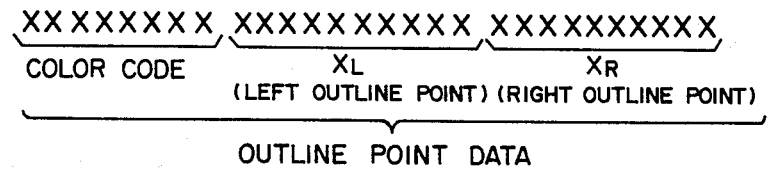
(B)
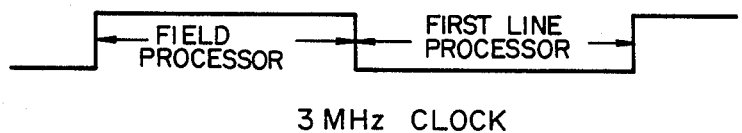
3 MHz CLOCK
FIG. 24
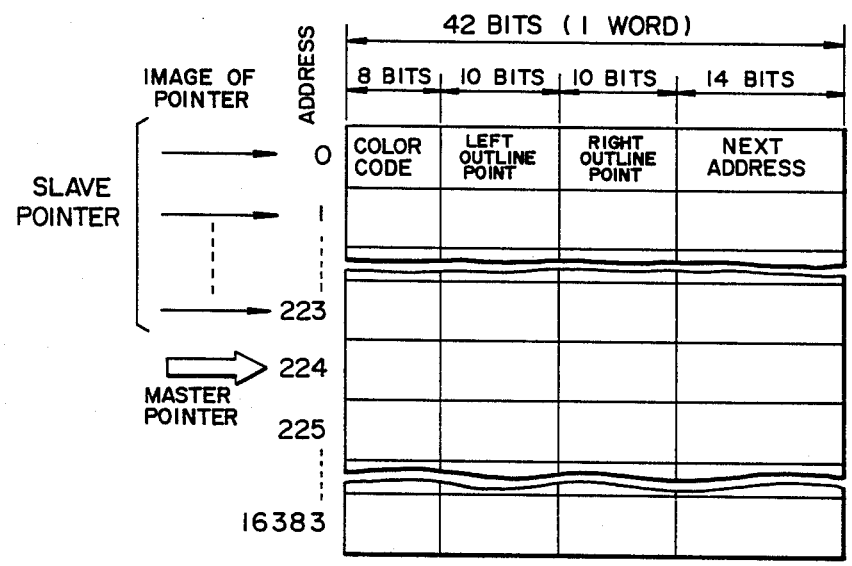

FIG. 15 (A)

FORMAT OF MAP MEMORY (LEFT)

| ADDRESS (X-COORDINATE) | 0 | 1 | --- | $X_{LB}$ | $X_{LB}+1$ | --- | $X_{LC}$ | $X_{LC}+1$ | --- | $X_{RC}$ | $X_{RC}+1$ | --- |
|---|---|---|---|---|---|---|---|---|---|---|---|---|
| DATA (PRIORITY-NUMBER) | x | x | --- | 1 | x | --- | 2 | x | --- | x | x | --- |

⎵ ONE WORD

| $X_{LA}$ | $X_{LA}+1$ | --- | $X_{RB}$ | $X_{RB}+1$ | --- | $X_{RA}$ | $X_{RA}+1$ | --- | 575 |
|---|---|---|---|---|---|---|---|---|---|
| 0 | x | --- | x | x | --- | x | x | --- | x |

FIG. 15 (B)

| ADDRESS (X-COORDINATE) | 0 | 1 | --- | X_LB | X_LB+1 | --- | X_LC | X_LC+1 | --- | X_RC | X_RC+1 | --- |
|---|---|---|---|---|---|---|---|---|---|---|---|---|
| DATA (PRIORITY-NUMBER) | × | × | --- | × | × | --- | × | × | --- | 2 | × | --- | one word

| X_LA | X_LA+1 | --- | X_RB | X_RB+1 | --- | X_RA | X_RA+1 | --- | 575 |
|---|---|---|---|---|---|---|---|---|---|
| × | × | --- | 1 | × | --- | 0 | × | --- | × |

FORMAT OF MAP MEMORY (RIGHT)

FIG. 16 (A)

| ADDRESS | 0 | 1 | 2 | --- | 7 | 8 | --- | $\text{int}(X_{LB}/8)$ | --- |  |
|---|---|---|---|---|---|---|---|---|---|---|
| X-COORDINATE | 0 | 0 | 0 | --- | 0 | 0 | --- | $X_{LB}$ | --- | $X_{LC}$ |
| DATA, PRESENCE OF LEFT-HAND OUTLINE POINT | 0 | 0 | 0 | --- | 0 | 0 | --- | 1 | 0 | 1 |

ONE WORD

| $X_{RC}$ | --- | $X_{LA}$ | $X_{RB}$ | --- | $X_{RA}$ | --- | 70 | --- | 567 | 568 | --- | 71 | --- | 574 | 575 |
|---|---|---|---|---|---|---|---|---|---|---|---|---|---|---|---|
| 0 | --- | 1 | 0 | --- | 0 | 0 | | --- | 0 | 0 | --- | | --- | 0 | 0 |
| 0 | --- | | | | | | | | | | | | | | 0 |

ONE WORD  ONE BIT

FIG. 16 (B)

| ADDRESS | 0 | 1 | 2 | --- | 7 | 8 | --- | $\text{int}(X_{LB}/8)$ | --- | |
|---|---|---|---|---|---|---|---|---|---|---|
| X-COORDINATE | 0 | 0 | 0 | --- | 0 | 0 | --- | $X_{LB}$ | --- | $X_{LC}$ |
| PRESENCE OF RIGHT-HAND OUTLINE POINT | 0 | 0 | 0 | --- | 0 | 0 | --- | 0 | --- | 0 | one word

| | | | | | | | 70 | | | | | 71 | | |
|---|---|---|---|---|---|---|---|---|---|---|---|---|---|---|
| $X_{RC}$ | $X_{LA}$ | --- | $X_{RB}$ | --- | $X_{RA}$ | --- | 567 | 568 | --- | --- | 574 | 575 |
| 0 | 0 | --- | 1 | --- | 1 | 0 | 0 | 0 | --- | 0 | 0 | 0 |
| 1 | 0 | --- | — | --- | 0 | | | | | | | | one word / one bit

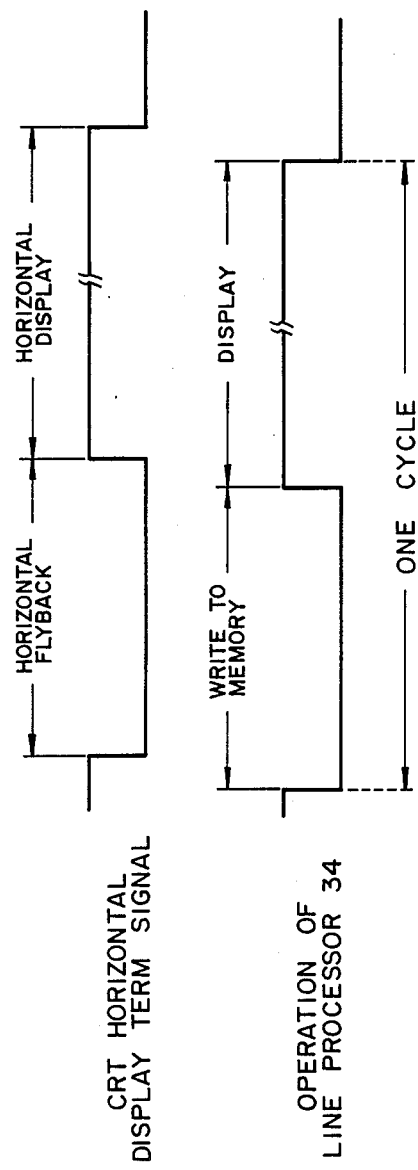

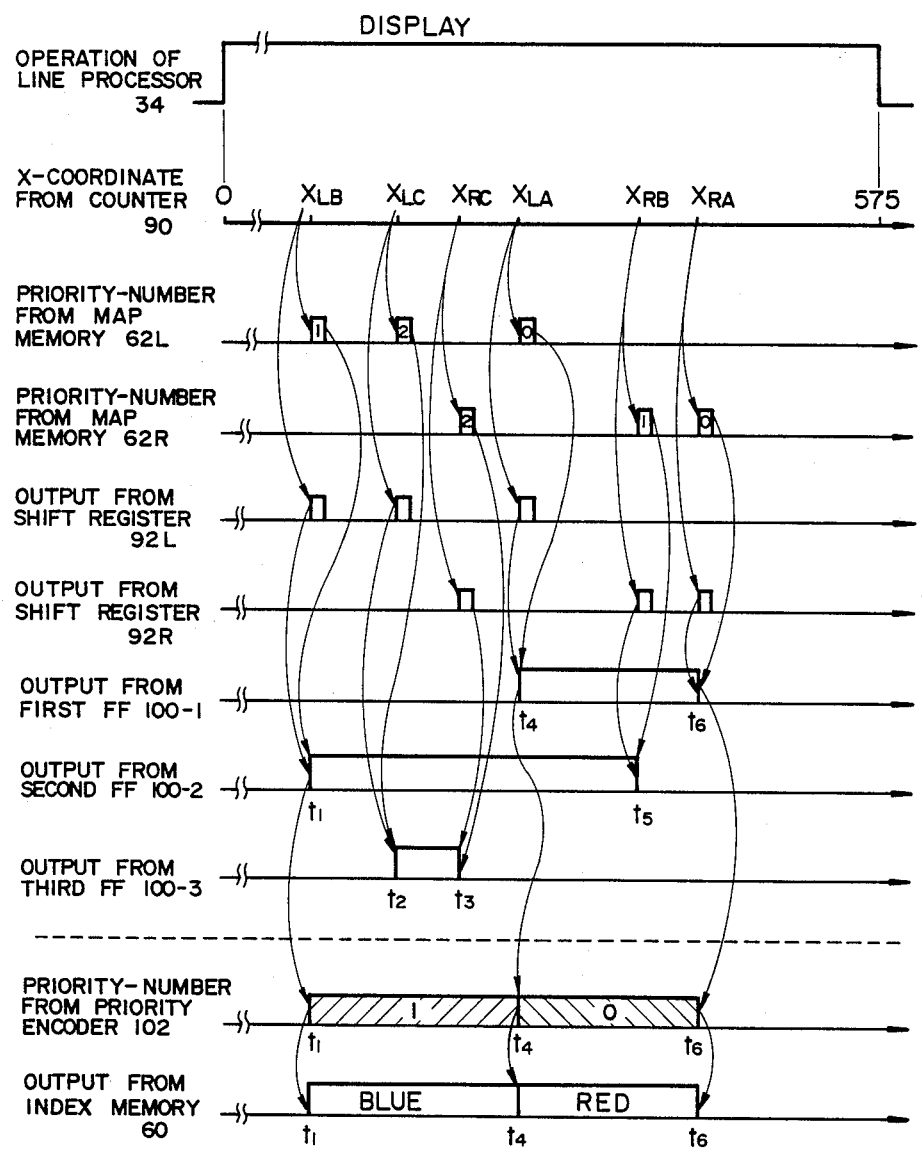

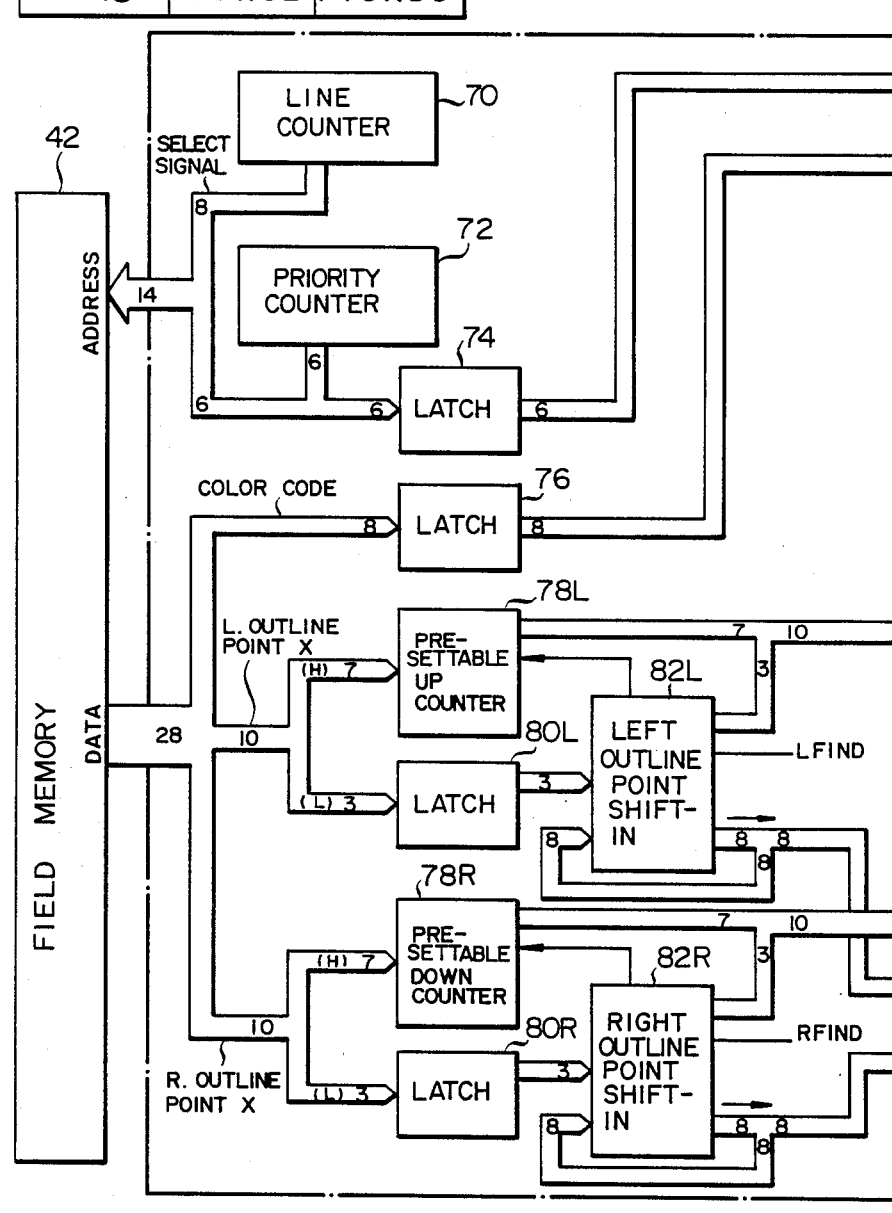

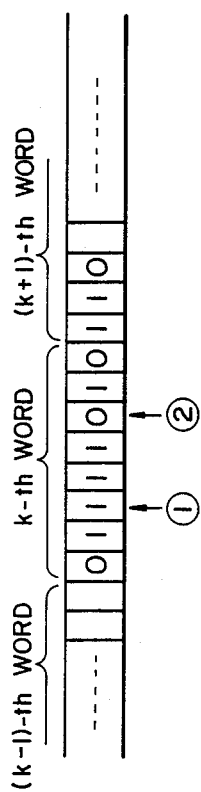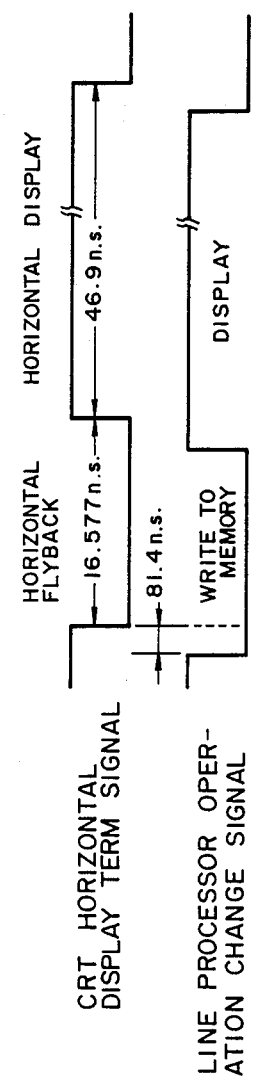

| FIG.20A | FIG.20B |

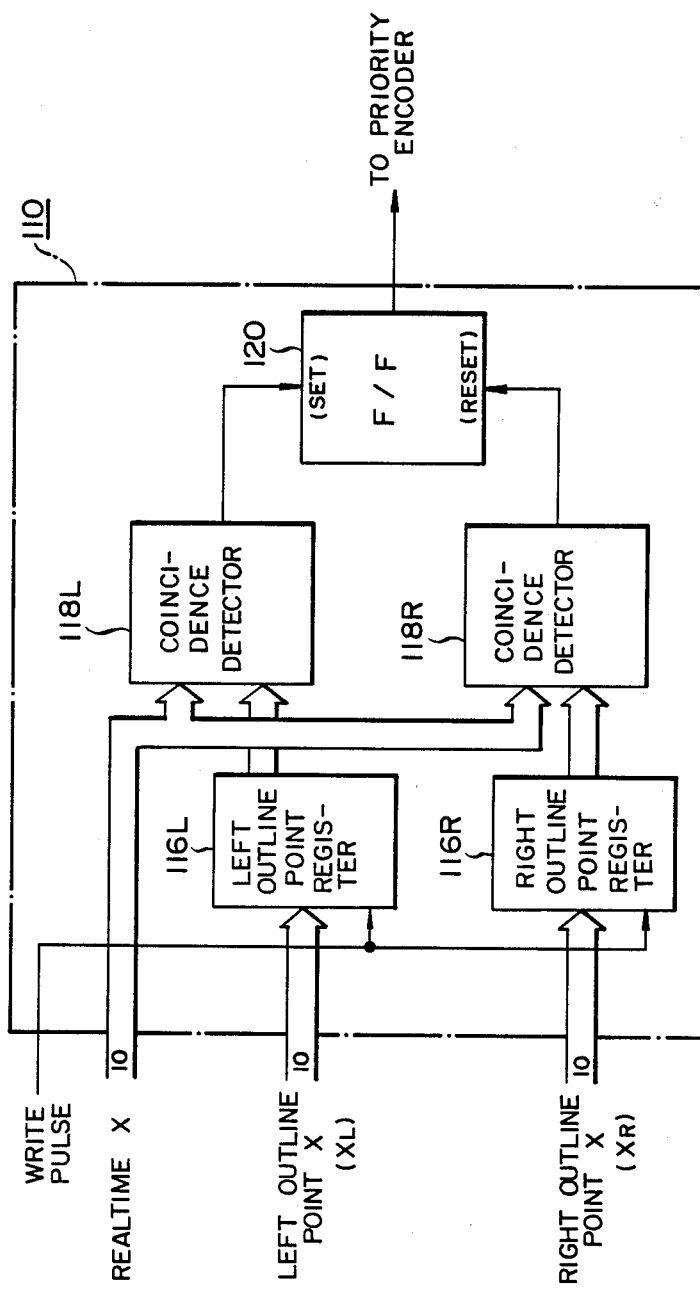

| FIG.25A | FIG.25B |

| FIG.26A | FIG.26B |

| FIG.28A | FIG.28B |

| FIG.29A | FIG.29B |

IMAGE COMPOSING APPARATUS

BACKGROUND OF THE INVENTION

1. Field of the Invention:

The present invention relates to an image composing apparatus and particularly to such an apparatus capable of real-time composing and outputting image signals based on image data from a source.

2. Description of the Prior Art:

An image composing circuit is one that composes and outputs various different types of image signals for CRT display, based on image data which are externally supplied to the circuit. Such an image composing circuit can form not only two-dimensional, plane images, but also two dimensional stereo images, that is, pseudo three dimensional images. For such a capacity, the image composer has broadly be used in various different applications, for example, such as three dimensional image type video games, aircraft and other simulators, computer graphics, CAD displays and others.

In the past, such an image composing circuit is on the basis of a so-called bit map display (graphic display) and therefore includes a bit map memory having memory areas corresponding to all pixels of a CRT scene in one-to-one proportion.

All the pixel data displayed in one scene are written in each of the memory areas. For example, where any pattern is to be displayed in computer graphics and the like, the outline of the pattern is drawn on a screen and the internal area of the same is then filled with a specified color.

In the image composer, it is frequent that a plurality of patterns are simultaneously displayed. Particularly, where a plurality of patterns are to be displayed in an overlapping condition, there is a problem in how to fill the overlapped areas.

There are known two fill area systems, one for effecting the fill area operation starting from a pattern having the highest priority and the other for carrying out the fill area starting from a pattern having the lowest priority.

However, these fill area systems in the prior art have the following problems (A) to (C):

(A) The former has a problem in that it is difficult to real-time display an object moving at high speed because the speed of the image processing is very slow.

In other words, where a plurality of patterns are to be displayed in an overlapping state by carrying out the fill area operation from a pattern having the highest priority (the nearest pattern) toward a pattern having the lowest priority (the farthest pattern), it is required that the data of the previously written pattern of higher priority will not be erased by the data of the latterly written pattern.

Prior to said fill area operation, therefore, data must be read out of all the data written areas to be filled, such that it will be discriminated whether or not data are written in each of the areas. Thereafter, the fill area operation is performed for only any area which is judged to have no written data. This is called "read-modify-write" operation.

Thus, the fill area operation cannot rapidly be carried out for the bit map memory. It is frequent that the fill area operation cannot follow variations in the image. Consequently, the object moving at high speed cannot be real-time displayed.

It is also possible to perform said read-modify-write operation at a higher speed by increasing the capacity of the data bus used.

However, this makes the whole system larger and costly in comparison with the handled amount of data. This will create a new problem in that the system itself becomes non-practical.

(B) The second-mentioned system, which performs the fill area operation sequentially starting from a pattern having the lowest priority, has a problem in that a pattern having the highest priority may be fallen off.

In other words, the system displays a plurality of superimposed patterns by effecting the fill area operation sequentially from a pattern having the lowest priority to a pattern having the highest priority.

Therefore, the system does not require said read-modify-write operation. The whole circuit thereof can totally be simplified and yet perform the fill area operation at a relatively high speed.

On the contrary, the prior art system cannot write the pattern having the highest priority into the memory if time required to write the data is insufficient. As a result, only the pattern having the lowest priority will be displayed in the CRT screen without writing of the pattern having the highest priority.

(C) Furthermore, the prior art system based on the bit map display has a problem in that its necessary memory capacity will extremely be increased.

In other words, the bit map display technique requires a large capacity bit map memory including memory areas corresponding to all pixels on the CRT.

Particularly, where a desired color image is to be displayed on the CRT screen, the necessary capacity of memory will be equal to the number of pixels times the number of color data bits for color display. This results in very increased capacity of the memory used.

SUMMARY OF THE INVENTION

In view of the above problems of the prior art, it is an object of the present invention to provide an image composing apparatus capable of real-time composing and outputting image signals based on the outline data of a given pattern.

To this end, the present invention provides an image composing apparatus for real-time composing and outputting image signals for CRT display based on contour point data of a given pattern, said apparatus comprising:

contour point data memory means including horizontal scan memory areas respectively corresponding to horizontal scan lines, said horizontal scan memory areas being adapted to store contour point data sequentially written therein depending on their priorities, said contour point data comprising pairs of left and right contour points at each of which the contour line of a given pattern for CRT display intersects each of the horizontal scan lines and attendant data of said pattern;

an index memory for synchronizing with a horizontal scan signal to read the attendant data included in each of the contour point data from a horizontal scan memory area corresponding to a vertical scan location of said horizontal scan signal, said read attendant data being written and stored in each address of said index memory according to its priority; and address generating means for synchronizing with the horizontal scan signal to sequentially read the contour point pairs included in each of the contour point data from the horizontal scan memory area corresponding to a vertical scan location of said horizontal scan signal, the read address of the corresponding attendant data being outputted to said index memory depending on its priority when the horizontal scan is being performed within an area specified by each of the contour point pairs.

BRIEF DESCRIPTION OF THE DRAWINGS

FIGS. 4 (A) and (B) illustrates the relationship between contour point data and a field memory.

FIG. 5 is a schematic view of an index memory used in the present invention.

FIG. 8 illustrates the concrete arrangement of a field processor circuit.

FIG. 14(A) illustrates the contour point data used in the present embodiment.

FIG. 14(B) illustrates a read/write timing for the field memory.

FIGS. 15(A) and (B) 16(A) and (B) schematically illustrate map and sub-map memory used in the present embodiment.

FIGS. 17(A) and 17(B) are timing charts illustrating the operation of the line processor circuit shown in FIG. 5

FIG. 19 illustrates the shift-in processing of the line processor circuit shown in FIG. 5.

FIG. 24 illustrates another concrete example of the field memory shown in FIG. 1.

DETAILED DESCRIPTION OF PREFERRED EMBODIMENT (Contents of Embodiment)

A. Summary of the Invention
B. Embodiment
  B1: Source of Image Data
    # Points Aimed At;
    # Arrangement;
    # Function;
    # Attendant Data; and
    # Communication Memory.
  B2: Field Processor Circuit
    # Polygon Recognition Number
  B3: Image Composing Apparatus
    (a) Memory Circuit
      a-1. Field Memory
        # Sequence of Data Writing; and
        # Word Arrangement.
      a-2. Attendant Data Memory
    (b) Index Memory
    (c) Line Processor Circuit
    (d) Comparison of the Present Embodiment with the Prior Art
C. Concrete Examples
  C1: First Concrete Example
    (a) Specification
    (b) Dual-Port RAM
    (c) Source of Image Data
    (d) Field Processor Circuit
      # Arrangement; and
      # Operation.
    (e) Field Memory
    (f) Index Memory
    (g) Line Processor Circuit
      Index Memory;
      Map Memory;
      Sub-Map Memory;
      First Line Processor; and
      Second Line Processor.
  C2: Second Concrete Example
  C3: Third Concrete Example
    # Completely Discontinuous Type; and
    # Semi-continuous Type.
D. Comparison of the Present Invention with the Prior Art
  # Conditions of Comparison;
  # Processing Time in Field Processor Circuit;
  # Processing Time in the Present Invention;
  # Processing Time in the Prior Art Bit Map Display; and
  # Comparison.

(Embodiment)

The present invention will now be described in connection with a preferred embodiment and with reference to the drawings.

A: Summary

The present invention relates to an apparatus capable of real-time composing and outputting image signals for CRT display based on various different data of a pattern externally supplied from a source.

Figure 2:
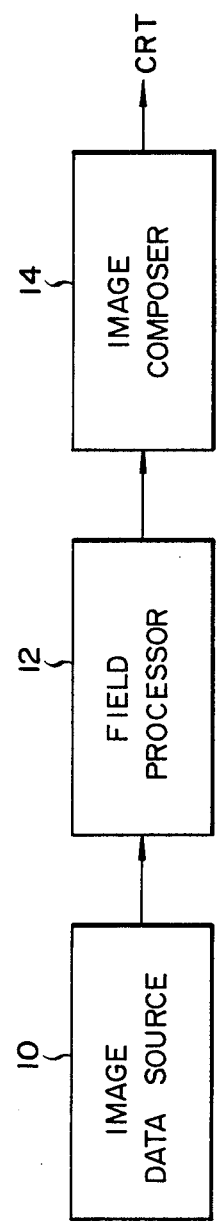
FIG. 2 is a block diagram of the whole image composing apparatus according to the present invention.

Referring now to FIG. 2, there is shown a preferred example of a pseudo three-dimensional image composing system to which the present invention is applied. Such a system comprises a source of image data 10, a field processor circuit 12 and an image composing apparatus according to the present invention.

The source of image data 10 is adapted to handle three-dimensional or stereo data such that they will be subjected to various conversions such as rotation, translation, seeing-through projection and others to convert the three-dimensional data to be displayed into a combination of data of a two-dimensional pattern which in turn will be outputted as pseudo three-dimensional data.

The pseudo three-dimensional data includes data of the form, position, priority and others of a pattern as well as attendant data including, for example, color codes and others.

The field processor circuit 12 is adapted to calculate the contour of a pattern to be displayed on CRT, based on the pseudo three-dimensional data outputted as described previously. The field processor circuit 12 is also adapted to sequentially output the contour points of a polygon with the corresponding data as contour point data.

The image composing apparatus 12 of the present invention is adapted to real-time calculate and output pseudo three-dimensional image signals for CRT display, based on the contour point data thus outputted.

B: Embodiment

Figure 1:
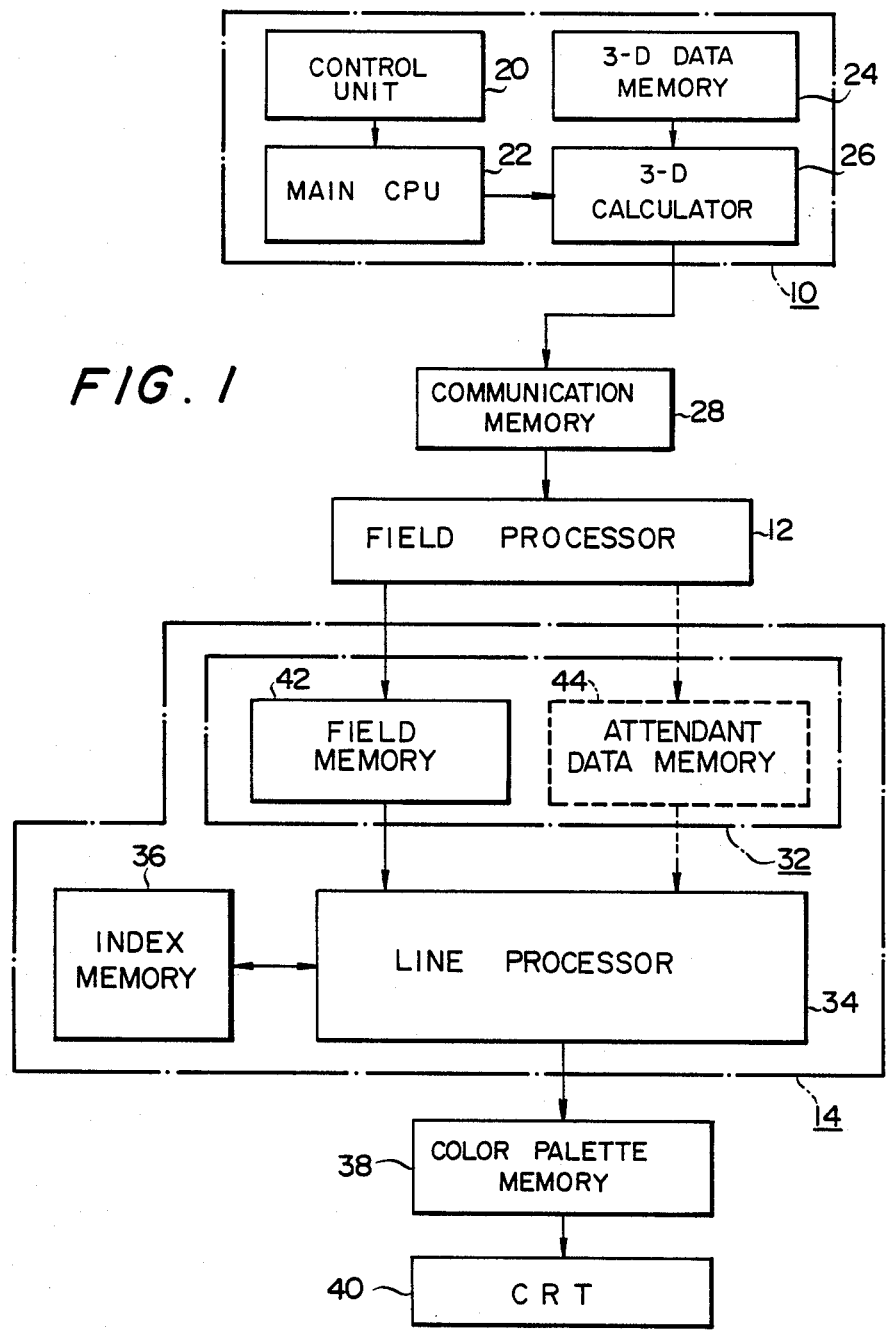
FIG. 1 is a block diagram of the whole arrangement of a simulator constructed by the use of an image composing apparatus according to the present invention.

FIG. 1 shows a preferred example of an aircraft operation simulator constructed of said pseudo three-dimensional image composing apparatus.

B1: Source of Image Data

In this embodiment, the source of image data 10 is adapted to calculate simulation images under various flight conditions during flight and to output these calculated simulation image to the field processor circuit 12 through a communication memory 28 as a combination of data of plural polygons.

Points aimed at:

In order to improve the reality of images outputted from the source of image data 10, it is advantageous to increase the amount of data to be handled.

On the contrary, the high-speed output of the image data source 10 can advantageously be accomplished by decreasing the amount of data to be handled.

In order to improve the reality of signals outputted from the image data source 10 and yet to attain the high-speed operation of the image data source 10, it is required to devise the processing of signals such that images improved in reality can be obtained by less amount of data.

To this end, it is preferable that data having less utility are sequentially cancelled from the pseudo three-dimensional data outputted from the image data source 10, as required. From such a standpoint, the applicant have made an examination of four points.

Point 1

Among data of a three-dimensional object, data having the lowest utility relates to the internal details of that object.

This is because the invisible internal details of the object can be neglected unless it is semitransparent.

It is therefore understood that sufficient data required for three-dimensional image is only data relating to the surface of the object.

Point 2

If data relating to the details of the surface of the object can be sacrificed, the contour of the object can simply be considered to be a combination of "planar patterns".

Therefore, when the data of the surface of the object are limited to only data of the "planar patterns" including the form, color and the like, the amount of data to be handled can further be decreased.

Point 3

If the data of the form limited in said point 2 are further limited to a further simplified pattern according to any regulations, for example, such as circle, ellipse or polygon, the amount of data to be handled can still further be reduced.

Point 4

In such a manner, a certain simplified pattern can suitably be selected from a plurality of pattern such as circle, ellipse, polygon and others. However, this will make the whole circuit complicated and also require new data for "selection of pattern".

It is therefore preferred that the sort of pattern used to display such a combination is limited to only one of the circle, ellipse and polygon.

From the standpoint of the display of any combined pattern, it is most advantageous to use a polygon having the most flexibility.

The illustrated source of image data 10 is defined from such a standpoint and adapted to calculate and output each of three-dimensional objects as combined data of plural polygons.

Thus, the image data source 10 can calculate and output data required to compose image signals having more reality at higher speeds.

Arrangement:

The concrete arrangement of the image data source 10 according to the present embodiment will now be described in detail.

In the embodiment, the image data source 10 comprises an control unit 20, a main CPU circuit 22, a three-dimensional data memory 24 and a three-dimensional arithmetic circuit 26.

The control unit 20 is formed completely in the same manner as in the cockpit of an actual aircraft. When the control unit 20 is manipulated, it is converted into an electrical signal through switches and variable resistors. The electrical signal will be applied to the main CPU circuit 22.

The main CPU circuit 22 forms the central section of the simulator and is adapted to calculate data representative of the attitude of the aircarft, based on signals from the control unit 20. Such calculated results are supplied to the three-dimensional arithmetic circuit 26.

The main CPU circuit 22 also is adapted to receive various different situation signals from the three-dimensional arithmetic circuit 26, for example, data representative of "impact of the aircraft on an other object", "incoming of the aircraft into an air turbulence" or "arrival of the aircraft to the goal". The main CPU circuit 22 then calculates the situation data which will be applied back to the three-dimensional arithmetic circuit 26.

The three-dimensional data memory 24 has stored three-dimensional coordinate data used to represent all objects as polyhedrons and to indicate the respective apexes of these polyhedrons, and polygon data representative of the respective surfaces of the polyhedrons as a group of apexes In such a case, the polyhedron data are represented by the use of a fixed coordinate system.

The three-dimensional arithmetic circuit 26 is adapted to calculate a scene viewable from the aircraft with reference to various polyhedron data stored in the three-dimensional data memory 24, based on the present attitude of the aircraft calculated by the main CPU circuit 22. Such a scene will be applied to the communication memory 28 as a combination of pattern data.

Function:

The above-mentioned calculation of polygon data will be accomplished in accordance with the following procedures.

Figure 3:
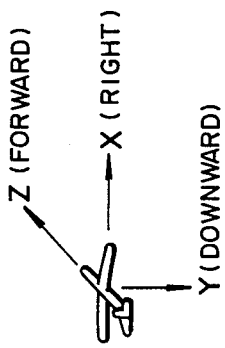
FIG. 3 illustrates an example of a moving coordinate system used in a source of image data.
Figures 6, 6A:
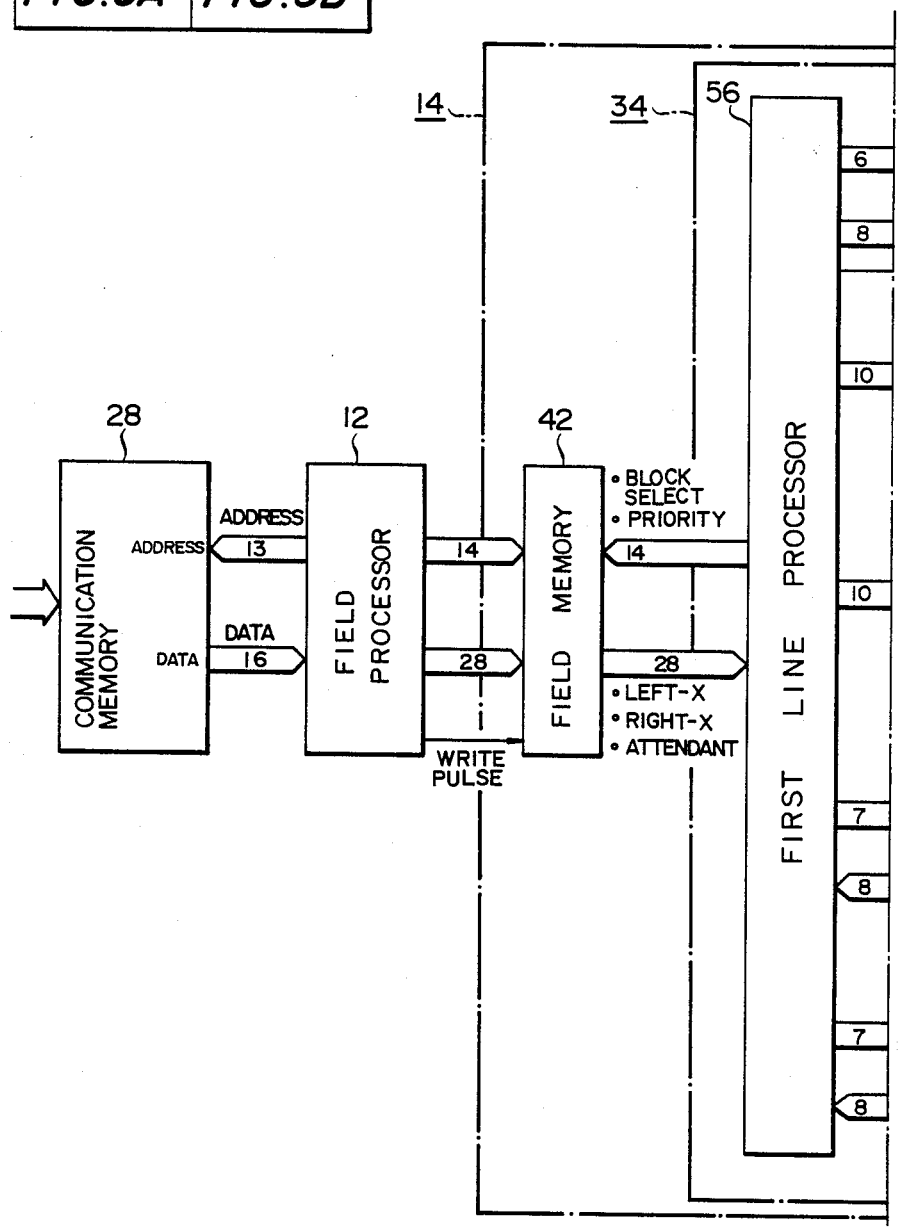
FIGS. 6,6(A) and (B) is a block diagram of a preferred example of the image composing apparatus of the present invention.
Figure 6B:
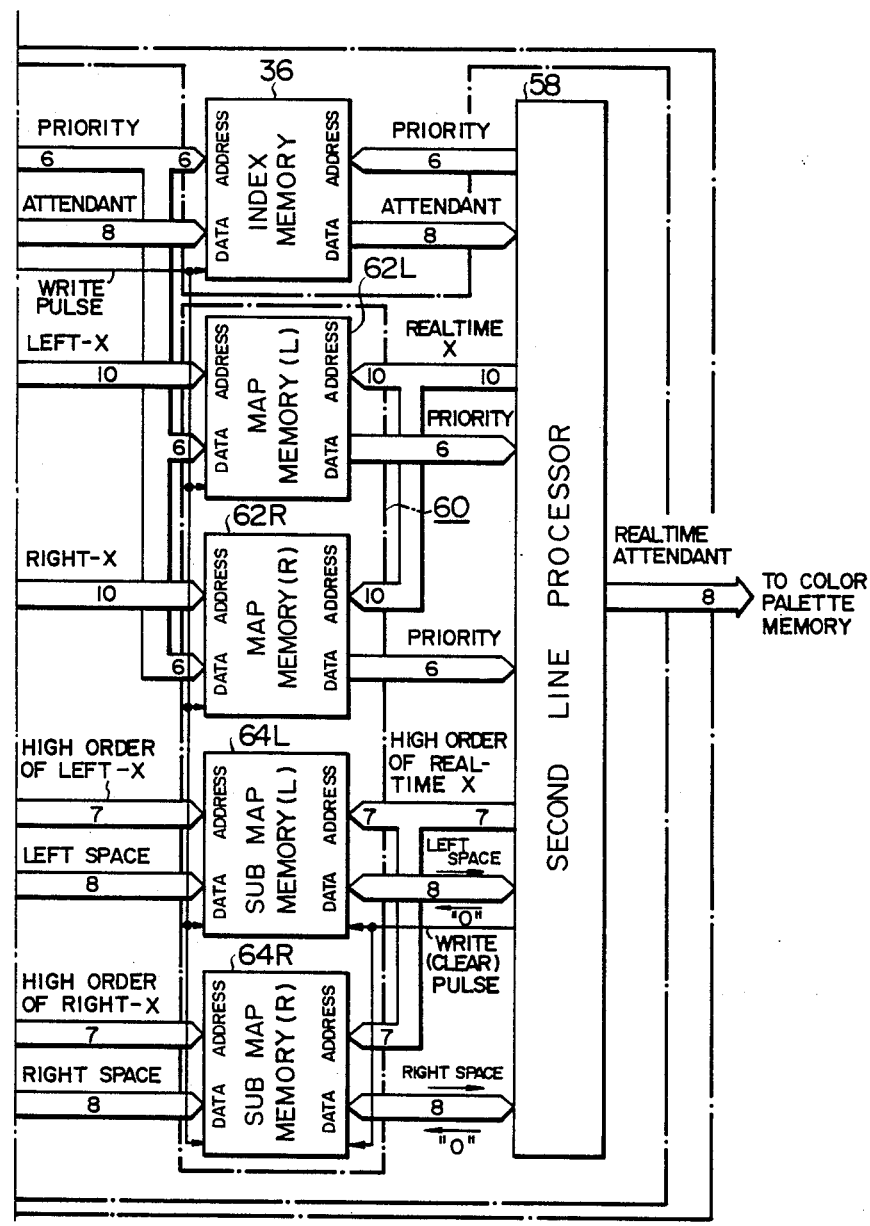

As shown in FIG. 3, the three-dimensional arithmetic circuit 26 is assumed such that the aircraft is at the origin of a moving coordinate system wherein, as viewed in this figure, X-coordinate extends rightwardly, Y-coordinate downwardly and Z-coordinate forwardly.

When moving coordinates representative of the present attitude of the aircraft are outputted from the main CPU circuit 22, the three-dimensional arithemetic circuit 26 begins to read given polyhedron data out of the three-dimensional data memory 24.

In the illustrated embodiment, the data written in the three-dimensional data memory 24 are based on the fixed coordinate system. Therefore, the three-dimensional arithmetic circuit 26 requires to convert the data read from the memory 24 into coordinate data in the moving coordinate system.

Such a conversion can be realized by utilizing a combination of two arithmetic factors which are obtained from the rotation and translation of the coordinate. In the conversion process, data determined to be invisible for a pilot (for example, z<0) are eliminated. Situation data obtained from the conversion are then supplied to the main CPU circuit 22.

The polyhedron data subjected to the conversion of coordinate are perspectively projected toward a visual point in z<0 if it is assumed that a display screen is in a plane representative of z=0.

Due to such a perspective projection, the polyhedron data can be represented by a group of point data obtained by converting the coordinates of the apexes in the polyhedron into two-dimensional coordinates (X and Y). Prior to such a perspective projection, a distance between the visual point and each of the apex coordinates of the polyhedron has been determined previously.

Two-dimensional point data (apex coordinates of the polyhedron) thus obtained by the perspective projection are then classified to each of polygons forming the contour of the polyhedron. Each of the classified polygons is then checked whether or not it is in the field of view of the pilot or the screen.

The field processor circuit 12 and the image composing apparatus 14 are set such that their ranges of acceptable coordinate is somewhat larger than said field of view.

To this end, the three-dimensional arithmetic circuit 26 is suitably modified so that it can checks the data obtained for each of the polygons to eliminate such a polygon as being completely out of the field of view and to held such a polygon that a part is in the field of view with the remaining part being out of the range of acceptable coordinate.

Thereafter, the three-dimensional arithmetic circuit 26 determines representative values of the distance from the visual point for each of the polygons which are within the ranges of acceptable coordinate.

These representative distance values will be supplied to the communication memory 28, starting from the polygon having the smallest representative value as polygon data having the highest priority.

Attendant data:

Each of the polygon data supplied to the communication memory 28 includes attendant data in addition to the two-dimensional coordinate data (X and Y) of each apex of that polygon.

The attendant data can be considered to include, for example, color codes and brightness data of a polygon or z-axis coordinate useful for composing a plurality of images. Furthermore, if the attendant data includes, for example, the inclination of the polygon, the subsequent arithmetic process can determine the brightness of the polygon based on the relationship between the inclination of the surface and the direction of incoming rays.

The present embodiment will be described below as if the attendant data includes color codes, for simplicity.

As will be apparent from the foregoing, the image data source 10 can function to convert a scene in the view field of the pilot into a combination of plural polygon data, with the polygon data being then applied to the communication memory 28 sequentially starting from the polygon data having the highest priority.

Communication memory:

The communication memory 28 functions as an interface between the image data source 10 and the field processor circuit 12, which is adapted to apply the polygon data from the image data source 10 to the field processor circuit 12 sequentially starting from the polygon data having the highest priority.

B2: Field Processor Circuit

The field processor circuit 12 functions as contour point data arithmetic means which is adapted to calculate and output the contour of a polygon to be displayed on CRT, based on the input data of that polygon.

The polygon data outputted from the image data source 10 starting from the data having the highest priority are updated in synchronizm with the field scan (scan to the odd or even fields) on the CRT.

To this end, the field processor circuit 12 is adapted to operate for a period of field scan as one cycle and then to store, at its internal register, polygon data inputted during such an operation sequentially from the highest priority toward the lowest priority.

When it is assumed that the image data source 10 sequentially outputs polygon data representative of polygons A, B and C as shown in FIG. 4 (A), the field processor circuit 12 first reads coordinate data (X, Y) representative of each of apexes a1, a2, a3 and a4 in the pattern A having the highest priority and the attendant data (color codes) relating to that pattern A. These read data are stored in the internal register of the field processor circuit 12.

The field processor circuit 12 then calculates contour point locations at which the contour line of the polygon A intersects the respective horizontal scan lines of the CRT, based on the coordinate data of the apexes included in the polygon data thus read out.

When it is assumed that a given pattern is present on a scan line, at least two contour points of that pattern are on such a scan line, except the apexes of the polygon. It will be defined that these two contour points are indicated as "left-hand contour point" and "right-hand contour point", respectively. The two contour points will totally be defined as "contour point pair".

Normally, such a contour point pair is considered to be only a pair of left- and right-hand contour points relating to one pattern. However, a plurality of contour points pairs may be on one scan line for a specific complicated pattern.

The field processor circuit 12 brings the respective contour points so determined by the arithmetic operation together into a contour point pair for each of the scan lines.

Contour data including the contour point pairs so obtained and the attendant data of that pattern are then supplied to the image composing apparatus 14.

Subsequently, the field processor circuit 12 continues to carry out the same operation with respect to the remaining polygons B and C to obtain their contour point data which in turn are adapted to be supplied to the image composing apparatus 14.

In such a manner, the output of the field processor circuit 12 will generate the contour point data consisting of the contour point pairs of the respective polygons A, B and C and their attendant data sequentially from the highest toward the lowest priorities.

In the present embodiment, the priority of each of the polygons is represented by the sequence of the contour point data outputted from the field processor circuit 12. For example, the contour point data of the polygons A, B and C will be outputted from the field processor circuit 12 starting from the pattern A having the highest priority.

On the contrary, the priorities of the polygons A, B and C may be represented by outputting the contour point data from the field processor circuit 12, starting from the lowest priority.

Further, the contour point data of the polygons A, B and C may include exclusive data representing their priorities. In such a case, the field processor circuit 12 can randomly output the contour point data of the polygons A, B and C irrespective of their priorities.

Polygon recognition number:

If an attendant data memory 44 is located within a memory circuit 32 as will be described, the field processor circuit 12 is required to create polygon recognition numbers corresponding to the respective polygons A, B and C. These recognition numbers will be supplied to the memory circuit 32 together with the aforementioned contour point pairs and attendant data.

B3: Image Composing Apparatus

In such a manner, the image composing apparatus 14 of the present invention can compose and output image signals for CRT display, based on the contour point information of the polygons A, B and C which is inputted to the apparatus 14 in the sequence starting from the highest priority.

In the illustrated embodiment, the image composing apparatus 14 comprises the aforementioned memory circuit 32, a line processor circuit 34 and an attendant data memory 36.

(a) Memory Circuit:

a-1. Field Memory

In the present embodiment, the memory circuit 32 functions as contour point data memory means which is normally formed by the use of a field memory 42. The memory circuit 32 stores all the polygon contour point data displayed on the CRT at each scene.

FIG. 4 (B) illustrates the concept of the field memory 42 in which its memory space is divided into horizontal scan memory areas corresponding to the number of scan lines forming one scene in one-to-one proportion. Each of the memory areas is given an address in relation to Y-axis coordinate Consequently, the contour point data of the respective polygons A, B and C outputted from the field processor circuit 12 will sequentially be written and stored at unoccupied area in the horizontal scan memory areas in relation to the Y-axis coordinate.

Sequence of Data Writing:

The apparatus of the present embodiment is adapted to represent the priorities of the polygons A, B and C by the use of a data writing sequence relating to the horizontal scan memory areas.

In other words, the field processor circuit 12 of the present embodiment is adapted to output the contour point data of the polygons A, B and C, starting from the highest priority. Therefore, the contour point data of the polygon A having the highest priority is first written in the respective horizontal scan memory areas of the field memory 42. The contour point data is subsequently written into the horizontal memory areas in the sequence from the polygon B toward the polygon C.

For example, the contour point data of the polygon A, B and C are written in horizontal scan memory areas specified by Y=20, starting from the smallest address.

On the contrary, where the contour point data of the polygons A, B and C are outputted from the field processor circuit 12 starting from the lowest priority, that is, in the sequence as shown by the order of the polygons C, B and A, the contour point data may be written and stored in the horizontal scan memory areas, starting from the lowest priority.

If the contour point data thus outputted from the field processor circuit 12 do not include any exclusive priority data, the priority of each of the polygons can be repesented by using the sequence of the contour point data to be written in the horizontal scan memory areas of the field memory 42.

If the contour point data from the field processor circuit 12 includes the exclusive priority data, it is a matter of course that the contour point data can be written and stored in the horizontal memory areas irrespective of their priorities. # Word Arrangement:

Aiming at the contour point data of each of the polygons thus written except those including the exclusive priority data, the contour point data consists of X-axis coordinates XL for the left-hand contour points, X-axis coordinates XR for the right-hand contour points and the attendant data of that polygon.

The writing of such polygon data may accomplished by the use of any word arrangement for the horizontal scan memory areas. However, the practical word arrangement may be considered to be in the following three styles:

(1) One word is used to store all the left-hand, right-hand contour points and attendant data of the contour point data of one polygon.

(2) Two words are used to store the contour point data of one polygon with the left-hand and right-hand points being assigned to the respective one of the words. The attendant data are divided into two groups which in turn are assigned to the respective one of the words, respectively.

(3) Three words are used to store the contour point data of one polygon. Each of the left-hand contour points, right-hand contour points and attendant data is stored in the corresponding one of the three words.

The present embodiment may take any one of the aforementioned word arrangements. It is a matter of course that lesser number of words used make the access more rapidly.

Depending on the selected one of the aforementioned word arrangements (1) to (3), the field processor circuit 12 will use a method of writing the contour point data, which is different from those of the remaining word arrangements.

When the first word arrangement is taken, there may be considered three writing methods:

The first writing method is such that during the arithmetic process of the contour points of one polygon, the contour point data are written in a word sequentially starting from the already determined contour point pair of that polygon.

In such a case, it is required to provide a memory for temporally storing one of the contour point pair. The first determined contour point will temporally be stored. When the other of that contour point pair is determined, both the two contour points of the pair will be written and stored in the word as a pair of contour points.

The second writing method is the use of read-modify-write method.

In accordance with this method, one of a contour point pair in a polygon is written in the word with its attendant data immediately after said one contour point has been determined, during the contour point calculation of that polygon. When the other contour point is determined, the previously written contour point is read out from the word and then will be written again in the same word with the new determined contour point.

At this time or the other time, the attendant data may be written in the word.

The third method is different from the previous methods in the procedure of determining the contour points of a polygon. Left- and right-hand contour points are simultaneously determined using the maximum or minimum point as a start point and written in the field processor circuit 12 with their attendant data. The third method must have a slightly complicated circuit for calculating the contour points.

On the second and third word arrangements, the field processor circuit 12 will carry out the writing immediately after each of the contour points has been determined during the calculation process of the contour points of a polygon. Particularly, when the third word arrangement is taken, only the attendant data should be written in the corresponding word separately from the contour points.

a-2. Attendant Data Memory

Paying attention to said attendant data, it is noted that they are written and stored, as a rule, in the field memory 42 together with the corresponding contour point pair as described.

Since the memory construction of the attendant data in the field memory 42 is redundant, it is preferred that another exclusive attendant data memory 44 is separately provided if the number of bits in the attendant data is larger.

In such a case, the field processor circuit 12 will output a polygon recognition number as contour point information, in addition to the contour point pair and attendant data.

Such a recognition number is used as an address to write the attendant data in the attendant data memory 44.

On the other hand, the polygon recognition number will be written in the field memory 42 in place of the attendant data.

It is normally frequent that the attendant data is of a simple form having less bits relating to, for example, color or brightness information. This results in less need of said attendant data memory 44.

However, if such attendant data includes information relating to specific functions such as Z-axis coordinates used to compose polygons into a unit and others in addition to said color and other data, the number of bits forming such attendant data would extremely be increased. It is thus required to provide the exclusive attendant data memory 44.

(b) Index Memory:

The index memory 36 is formed to write and store, at each of its addresses, attendant data included in plural contour point data written in the horizontal scan memory areas of the field memory 36, in accordance with their priorities.

FIG. 5 shows a format of the index memory 36 according to the present embodiment.

The index memory 36 is such that, when the line processor 34 synchronizes with a horizontal scan signal to read contour point data from each of the horizontal scan memory areas corresponding to the vertical scan location of said horizontal scan signal, the attendant data included in the contour point data will be written and stored in the index memory 36 at an address set according to the priority of said attendant data.

In the illustrated embodiment, addresses are denoted respectively by "0", "1", "2" and etc., starting from the highest priority.

If the attendant data of each of the polygons A, B and C represents the respective one of red, blue and yellow color codes, they will be written in the index memory 36 at the addresses 0, 1 and 2, respectively.

(C) Line Processor Circuit:

The line processor circuit 34 synchronizes with a horizontal scan on the CRT to read the contour point data of each polygon from a horizontal scan memory area corresponding to the vertical scan location of said horizontal scan.

Sequence of Writing

At this time, it is important what kind of sequence is used to read the contour point data.

For example, where the priorities of the polygons A, B and C are represented by the use of a sequence wherein the contour point data are written on the horizontal scan memory areas, the contour point data can be read out in accordance with the forward or backward order of the priority for each polygon (starting from the highest or lowest priority). Based on those sequences, each of the priorities of the contour point data can automatically be discriminated.

In contrast with this, for example, where the contour point data include an exclusive priority data, it is a matter of course that the contour point data can randomly be read out from the horizontal scan memory areas. In such a case, the priority of the contour point data may be thereafter discriminated by the use of its priority data.

In the illustrated embodiment, the contour point data of each of the polygons are written in the field memory 42 at each of its horizontal scan memory areas, starting from the highest priority.

The line processor circuit 34 is such that the read-out of the contour point data from each of the horizontal scan memory areas is accomplished starting from the highest priority as in the writing operation of the same.

For example, if it is assumed that a line shown by Y=20 in FIG. 4 is to be horizontally scanned, the line processor circuit 34 first reads the contour point data of the polygon A from the horizontal scan memory areas and subsequently those of each of the polygons B and C in such a sequence as described.

Writing of Attendant Data:

Furthermore, the line processor circuit 34 is adapted to write and store the attendant data included in the contour point data read with respect to each of the polygons according to the priority thereof at the respective addresses of the index memory 36 shown in FIG. 5.

If it is therefore assumed that red, blue or yellow color code is included in the contour point data of each of the polygons A, B and C as its attendant data, that color code will be written in the index memory 36 at the respective address based on the priority of the attendant data, as shown in FIG. 5.

Creation of Read Address:

Simultaneously, the line processor circuit 34 synchronizes with the horizontal scan of the CRT to output a read address of the attendant data to said index memory 36.

In other words, the line processor circuit 34 synchronizes with a horizontal scan signal to read the contour point data of each of the polygons from a horizontal scan memory area corresponding to the vertical scan location of said horizontal scan signal in accordance with the priority of the contour point data.

When a horizontal scan is carried out within the range of a specified contour point pair included in the read contour point data, the read address of the corresponding attendant data is supplied to the output of the index memory 36 in accordance with the priority of said attendant data.

Therefore, if it is assumed that the contour point data of each of the polygons A, B and C include the respective color code of red, blue or yellow as the attendant data and when the horizontal scan is being performed in an area defined by the left- and right-hand contour points in each of the polygons A, B and C, a read address corresponding to the attendant will be supplied to the output of the index memory 36.

Where there are areas overlapped by each other in the polygons A, B and C shown on the line Y=20 in FIG. 4, the line processor circuit 34 will output an attendant data read address such that the color code of a polygon having its higher priority is preferentially outputted.

Where the horizontal scan is being performed within the contour point pair specifying range of each of the polygons A, B and C, the image composing apparatus 14 according to the present embodiment will compose and output image signals with respect to one horizontal scan such that the corresponding attendant data (color codes) can be outputted in real-time manner.

The so outputted image signals with respect to one horizontal scan are converted into color signals in the color palette memory 38, these color signals in turn being supplied to the CRT 40.

The line processor 34 and index memory 36 are adapted to repeat such composing of image signals in synchronism with the horizontal scan of the CRT. Thus, a simulation image from the image data source 10 will be displayed well on the CRT 40 as a combination of the data of the polygons.

If the memory circuit 32 includes the attendant data memory 44 in addition to the field memory 42, the line processor circuit 34 first reads the contour point data from the field memory 42 in the same manner as described. Each of the polygon recognition numbers included in the contour point data may be used as an address to read the corresponding attendant data from the attendant data memory 44.

Although the present embodiment of the present invention has been described as to an example wherein the contour point data of the polygons outputted from the field processor circuit 12 are used to compose image signals, the present invention is not intended to be limited to such an arrangement. For example, image signals can similarly be composed and outputted even if the field processor circuit 12 outputs the contour point data of any pattern other than the polygons, such as circle, ellipse and others.

(d) Comparison of the Present Embodiment with the Prior Art:

(i) The apparatus of the present invention does not require a so-called fill area operation of the attendant data.

The image composing apparatus of the prior art utilizing the bit-map-display system requires to set the contour line of an image in the bit map memory and thereafter to subject an area encircled by this contour line to a so-called "fill area operation" by a given attendant data. Therefore, the image composing apparatus of the prior art cannot compose the image for a shotened period of time.

Particularly, when the display of patterns is carried out starting from a pattern having the highest priority, the so-called "read-modify-write" operation is required. As a result, time required to effect the fill area operation will further be increased. Frequently, the fill area operation cannot follow the change of that image. There is a problem in that any object moving at higher speed cannot be display in real-time.

Such a fill area operation can be performed at higher speeds if bus lines of larger capacity are used. However, this makes the capacities of the bus lines and other components too large relative to the amount of data to be handled therein such that the whole apparatus will be increased in size and cost.

On the contrary, the image composing apparatus of the present embodiment is such that only the attendant data are written in the index memory 36 separately from the contour point pair. The attendant data thus written are sequentially outputted from the index memory 36 depending on the read address which is outputted from the line processor circuit 34. Thus, the image composing apparatus of the present invention requires no fill area operation of the attendant data. Therefore, the image can be composed at higher speed.

In accordance with the present invention, therefore, the image signals can be composed in real-time without increase of the capacity of the bus lines.

(ii) In the apparatus of the present embodiment, the capacity of the memory used can be reduced.

In other words, the apparatus of the present embodiment does not require the capacity of memory corresponding to all the pixels on one scene. The whole capacity of memory used can be reduced.

(iii) The apparatus of the present invention can well compose image signals without loss of images having higher priorities.

More particularly, the apparatus of the present invention is such that the contour point data of the polygons A, B and C are written and stored in the horizontal scan memory areas of the field memory 42 sequentially starting from data having the highest priority. The contour point data thus written are then called by the use of the line processor circuit 34 sequentially starting from data having the highest priority. In such an arrangement, the pattern having the highest priority will not be lost even if time required to write and read the data is insufficient for any reason. Therefore, the image signals can be composed and outputted very well.

(iv) The apparatus of the present embodiment can compose and output a pseudo three-dimensional image having its increased reality in real-time.

In other words, the apparatus handles the contour of a three-dimensional object as a group of plural polygons to display the pseudo three-dimensional image.

In accordance with the present embodiment, therefore, the pseudo three-dimensional image having its increased reality can in real-time be composed and outputted from a reduced amount of data by the use of memory means having its reduced capacity.

C: Concrete Examples

Some concrete examples of the concept of the present invention will now be described in detail.

C1: First Concrete Example

FIG. 5 shows a first concrete example of the apparatus according to the present invention, wherein it is adapted to display 64 polygons per one horizontal scan line, based on the following specification:

(a) Specification

| (i) CRT(interrace) | |
|---|---|
| Number of pixels | 576 × 448 |
| | (576 × 224/field) |
| Number of scan lines | 525 |
| | (262.5/field) |
| Vertical synchronization frequency | 60.015 Hz |
| (Vertical cycle | 16.663 ms) |
| Horizontal synchronization frequency | 15.754 KHz |
| (Horizontal cycle | 63.477 us) |
| Dot clock frequency | 12.288 MHz |
| (ii) Number of polygons displayed (per scene) | 1.024 |
| (iii) Number of polygons displayed (horizontal) | 64 |
| (iv) Range of coordinates on input data | |
| $0 \leq X \leq 4095, 0 \leq Y \leq 2047$ | |
| (v) Range of coordinates on display | |
| $2048 \leq X \leq 2623, 1024 \leq Y \leq 1471$ | |
| (It is deemed that, on circuit $0 \leq X \leq 575$ and $0 \leq Y \leq 447$) | |

(b) Dual-Port RAM

It is preferred that each of the memories used in the present invention, for example, such as communication memory 28, field memory 42, index memory 36, map memory 62 and sub-map memory 64, is independently subjected to two separate works, that is, the writing of data by the preceding processor and the reading-out of data by the following processor. This is called "dual-port RAM".

Each of these dual-port RAM's used in the present invention has its capacity of memory which is two times as large as each capacity required for writing or reading. Each of the dual-port RAM's also has a memory space divided into two memory areas.

Each of the memory areas is formed such that it is alternately subjected to access from the proceeding and following processors at a constant cycle.

While data are being written into one of the memory areas in a dual-port RAM, data previously written are being read from the other memory area in the same dual-port RAM. Otherwise, new data are being written into the other memory area while the previously written data are being read from the one memory area.

Table 1 shows change cycle between the memory areas for each of the memories.

TABLE 1

| NAME OF MEMORY | CHANGE CYCLE |
|---|---|
| Communication Memory | Field |
| Field Memory | Field |
| Index Memory | Line |
| Map Memory | Line |
| Sub-Map Memory | Line |

(c) Source of Image Data

The source of image data 10 synchronizes with the field scan of CRT to output polygon data sequentially starting from the highest priority.

For example, when it is to display an image as shown in FIG. 4(A) on the CRT, the polygon data will sequentially be outputted in accordance with the priorities of the patterns A, B and C in the order described.

The so outputted data of each of the polygons includes attendant data and coordinate data (X, Y) relating to the apexes of that polygon.

It is assumed herein that the attendant data includes a color code representative of the displayed color of the polygon. The color code functions as an address used to read a color signal from the color palette memory 38.

Figure 7:
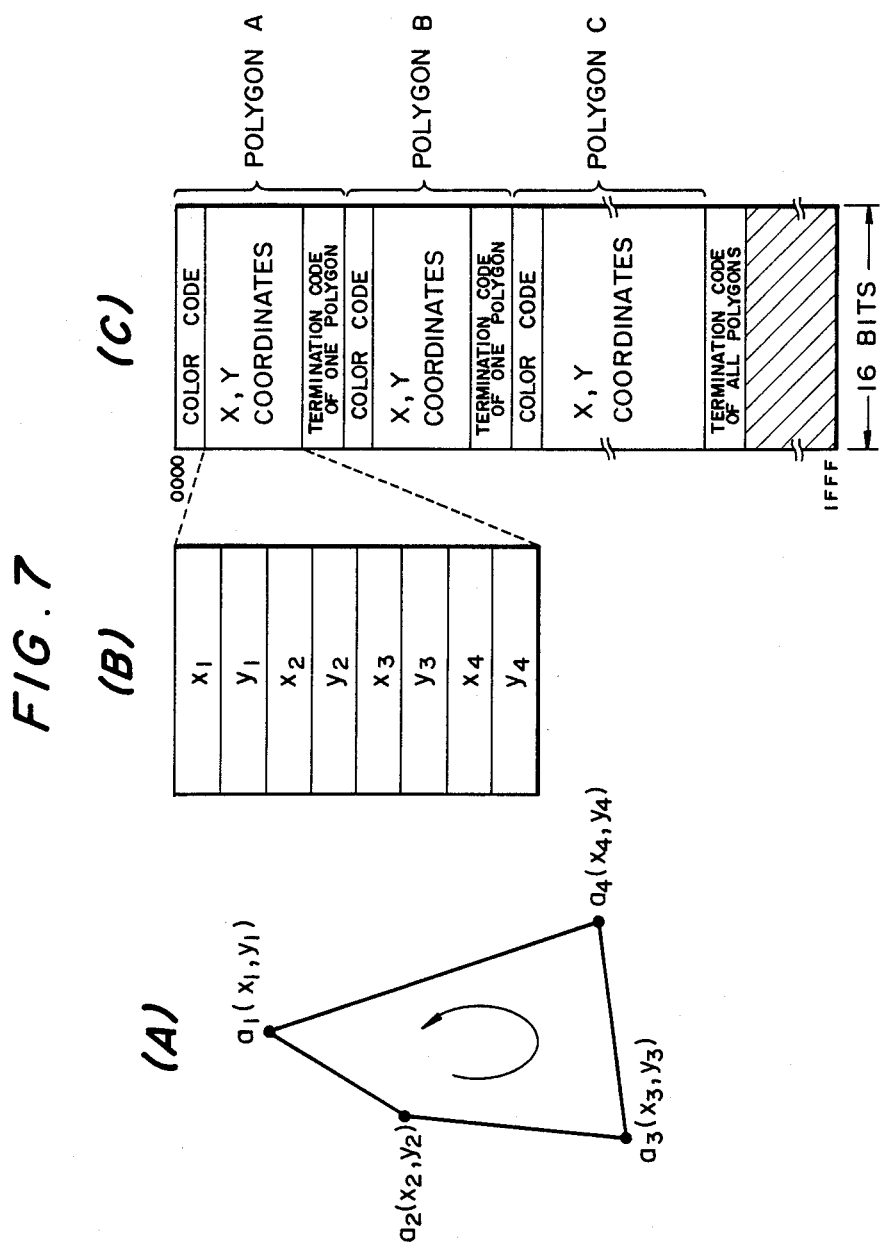
FIGS. 7 (A), (B) and (C) illustrates the arrangement of a communication memory.

As shown in FIG. 7(A), the apex coordinate data of each of the polygons is required to output them counter-clockwise around the contour of that polygon in the order described by a1, a2, a3 and a4.

This will cause the field processor circuit 12 to perform its function of eliminating a turned-out polygon, as will be described.

In such a manner, the polygon data of the polygons A, B and C will be written in the communication memory 28 according to their priorities, as shown in FIG. 7(B).

(d) Field Processor Circuit

FIG. 8 shows a concrete arrangement of the field processor circuit 12.

Arrangement

The field processor circuit 12 comprises a pre-processing circuit 46, a divider circuit 48, a segmenting circuit 50, a contour point buffer 52 and a contour point counter 54.

The pre-processing circuit 46 is adapted to read the polygon data written in the communication memory 28 as shown in FIG. 7(C) according to the priorities of the polygons A, B and C in the order described.

The polygon data thus read out are then re-arranged into the data of each of the sides defining the corresponding polygon and thereafter supplied to the input of the segmenting circuit 50. At the same time, the divider circuit 48 is used to calculate the inclination of each side of that polygon.

The segmenting circuit 50 first calculates the group of contour pairs in the polygon A having the highest priority, based on input data from the pre-processing circuit 46. Subsequently, the groups of contour point pairs will be calculated with respect to the other polygons in the order described by B and C.

The calculated contour point pairs are sequentially written to the field memory 42 as contour point data, together with the color code.

At this time, the contour point buffer 54 also is used such that the previously determined contour point data is temporally stored in the buffer 52 to obtain the corresponding contour point pair.

The contour point counter 54 is used as a group of registers for counting the number of contour points for each horizontal scan line.

The contour counter 54 is thus considered to be a counter for a pair of contour points displayed on one horizontal scan line as the count from the counter 54 is divided by two. This is nothing but a write pointer for the individual horizontal scan memory area in the field memory 42.

The least significant bit in this count can be used as a flag indicative of whether or not a contour point pair including left- and right-hand contour points has been completed.

Operation

FIGS. 9 to 13 show a flow chart of the field processor circuit 12, in which many of variables denoted by capital letters represent actually existing registers while variables designated by small letters show numeral values appearing on the bus lines:

X and Y: Coordinate values on each of the apexes included in the data of a polygon.

$X_0$ and $Y_0$: Coordinate values of the first apex of the polygon.

$X_1$ and $Y_1$: Coordinate values (as an effective segment) at the start point on one side.

$X_2$ and $Y_2$: Coordinate values (as an effective segment) at the end point of the side.

Q: Quotient, that is, inclination of the side.

X and Y: Coordinate values of a contour point.

YE(Y End): Y-axis coordinate value at the plot end point of the side.

XV(X Visible): X-axis coordinate value at a contour point on the display screen.

BR(Buffer): Contour point buffer corresponding to the number R of the scan line.

CR: Contour point counter corresponding to the number R of the scan line.

Figure 9:
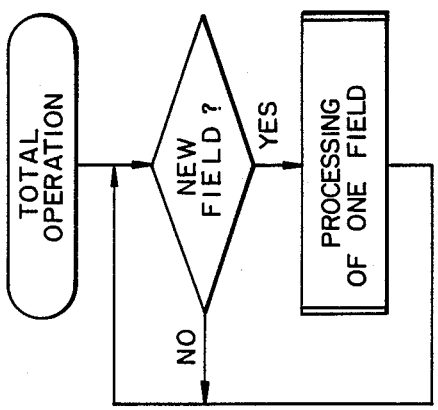
FIGS. 9, 11,12,12A,12B, and 13, are flow charts illustrating the operation of the field processor circuit shown in FIG. 8.

Referring now to FIG. 9, there is shown a flow chart illustrating the whole operation of the field processor circuit 12 which is adapted to repeat a given processing of field for each of new field scannings.

Figure 10:
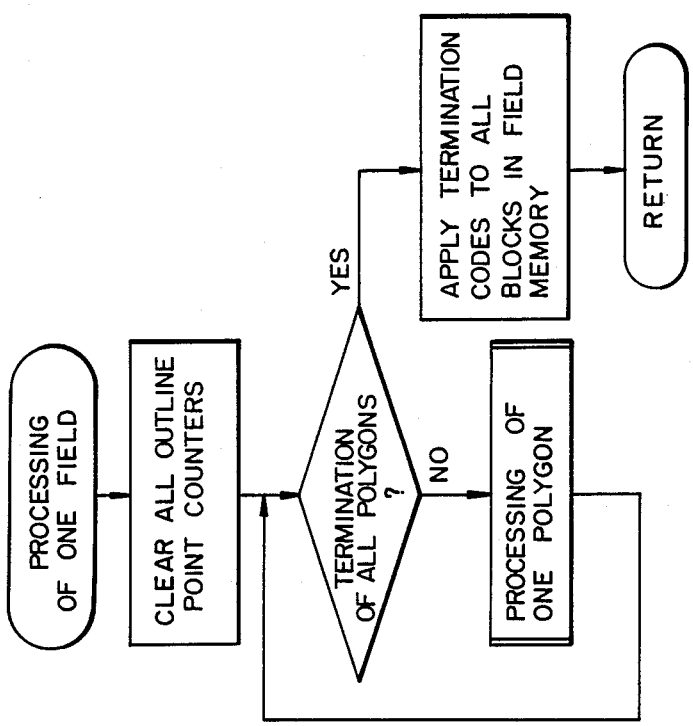

FIG. 10 shows the field processing operation shown in FIG. 9.

At the same time as a new field scan is initiated, the counter 54 is cleared to zero with respect to all the counts C0, C1, C2 . . . C223 which have be set relative to 224 horizontal scan lines.

Polygon data are then read out per one polygon from the communication memory 28 sequentially starting from a polygon having the highest priority. The processing is then carried out for that polygon.

Namely, the apparatus calculates all the contour point pairs of the polygon in question, based on the polygon data thus read out. After combined with the corresponding color code, each of the contour point pairs is written and stored in the field memory 42 as contour point data.

For example, if the communication memory 28 has stored such polygon data as shown in FIG. 7(C), said processing is first performed relative to the polygon A and thereafter sequentially relative to the polygons B and C.

On termination of the processing relative to all the polygons, a termination code is written onto each of the horizontal scan memory areas in the field memory 42, as shown by hatching in FIG. 4(B). More particularly, the writing of said termination code is performed at each of addresses each which comprises a combination of each of P=0, 1, 2. . . or 223 with the corresponding one of the counts C0, C1, C2 . . . or C223 in the counter 54.

Figure 11:
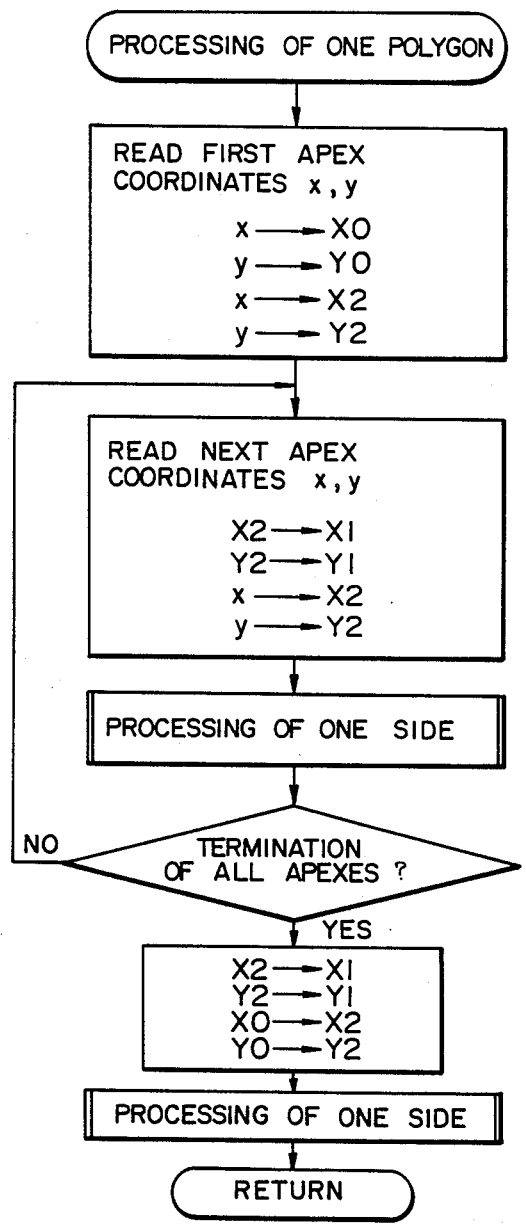

FIG. 11 shows a flow chart of the processing for one polygon shown in FIG. 10.

For example, as the processing is initiated for the polygon A, X- and Y-axis coordinates are read out with respect to the first apex a1 of this polygon A and then to the second apex a2 of the same.

Coordinates (X0, Y0; X1, Y1; X2, Y2) are respectively set by the use of an actual register. This register is such that as a coordinate are set at X2 or Y2, its original value will automatically set at X1 or Y1, respectively. At this time, the original values of X1 and Y1 will automatically be cancelled.

As X- and Y-axis coordinates of the apexes a1 and a2 are read out, one side (a1, a2) is subjected to the processing, based on this read data.

The processing will be repeated for the remaining sides (a2, a3; a3, a4; a4, a1) of the polygon.

Figures 12, 12A:
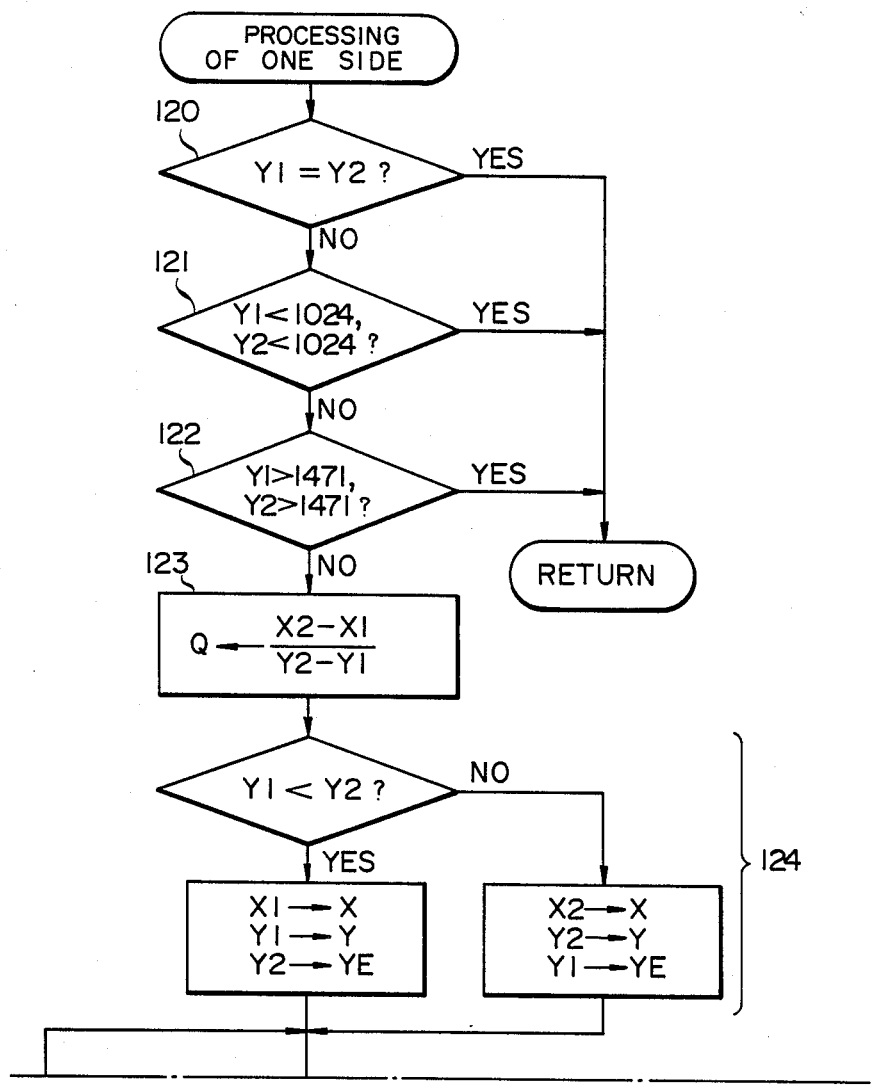
Figure 12B:
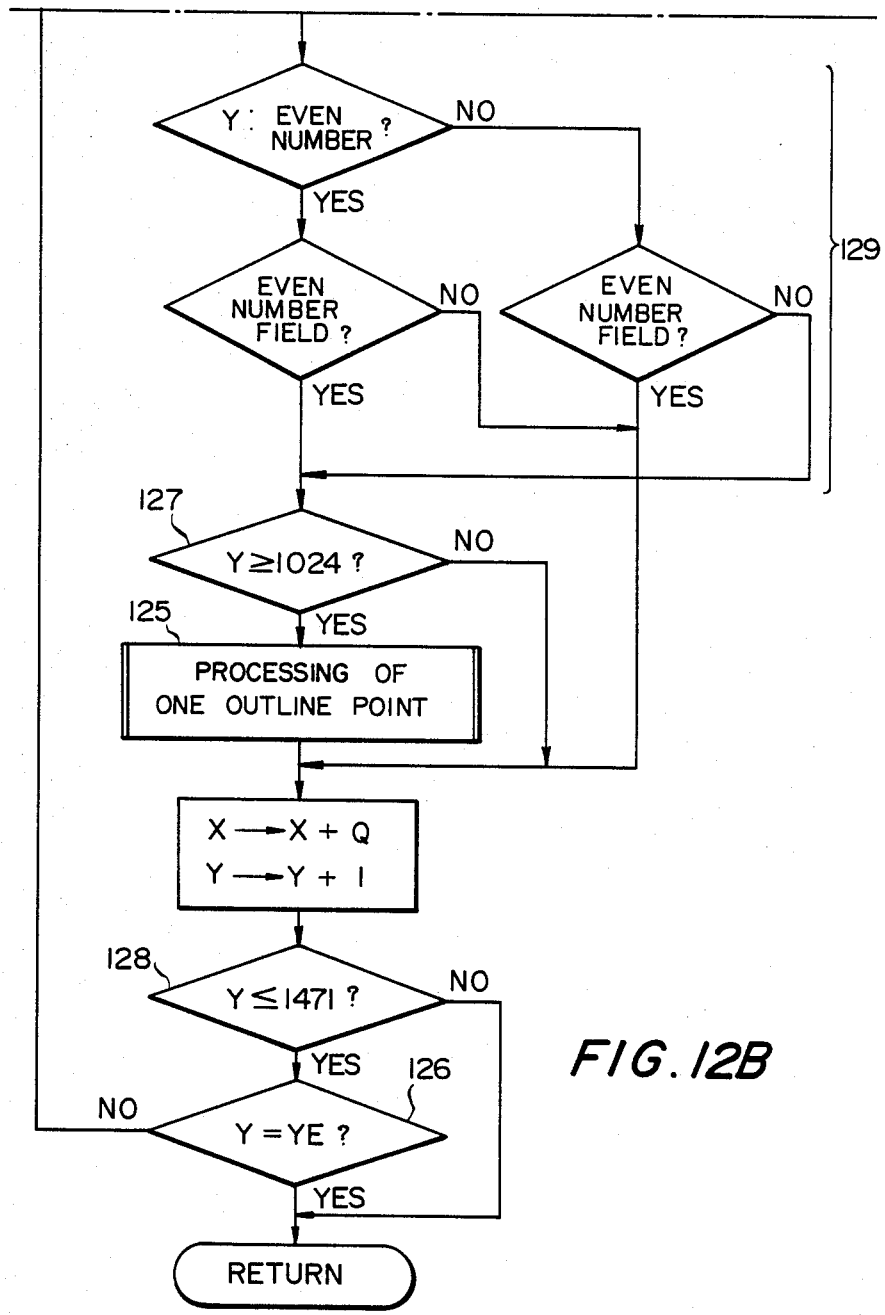

FIG. 12 illustrates the processing of one side shown in FIG. 11.

The apparatus first discriminates whether or not Y-axis coordinates at the opposite ends of the subject side coincide with each other (Step 120). If do so, it is judged that this side is not required to be plotted. Thus, the processing for this side will be terminated.

Next, the apparatus discriminates whether or not the Y-axis coordinates of the subject side are out of the scene in all respects (Steps 121 and 122).

When the subject side is in the range of acceptable coordinate and if the Y-axis coordinates defining that side are out of the scene in all respects, it is judged that the side is not required to be plotted. The processing of the side is terminated (first clipping stage).

The apparatus then calculates the inclination Q of the subject side (Step 123).

Although the inclination of the side is actually divided into two parts, that is, an interger part and a residual part, FIG. 12 shows the inclination Q as a real number for simplifying the description of algorithm.

In such a manner, the subject side is represented by the following equation:

$$X = QY + X1 - QY1,$$

and $$Q = (X2 - X2)/(Y2 - Y1).$$

Next, the apparatus determines which end of the subject side is used to initiate the calculation of the contour points (Step 124). To this end, it is judged which values Y1 or Y2 of the Y-axis coordinates at the opposite ends of the side are larger than the other. The start point at which the calculation of the contour points is initiated is initially set such that the calculation is necessarily performed in the direction in which the Y-axis coordinate is increased.

Subsequently, points whereat the subject side intersects the respective horizontal scan lines, that is, X-axis coordinates of the contour points are calculated sequentially from the start end to the finish end.

Considering the side (a1, a2) shown in FIG. 4(A), for example, there is first determined X-axis coordinates whereat the side (a1, a2) intersects one horizontal scan lines (Y=6) (Step 125). Contour points intersecting horizontal scan lines (y=8 and y=10) are sequentially determined.

When Y-axis coordinate of the horizontal scan line reaches a value YE set as the end of measurement, the calculation of contour points relating to this side (a1, a2) is terminated (Step 126).

If Y-axis coordinates intersecting the subject side (a1, a2) are out of the scene, it is not required to determine the contour points. The calculation of contour points is not carried out at that location (second clipping stage) (Steps 127 and 128).

In the present embodiment, the scanning is alternately performed with respect to the even and odd fields.

Therefore, the apparatus discriminates whether the scan being performed is relative to the even or odd field. If the scanning is relative to the even field, only contour points intersecting the even number of horizontal scan lines (Y=0, 2, 4...) are calculated. On the odd field, only contour points intersecting the odd number of horizontal scan lines (Y=1, 3, 5...) are calculated (Step 129).

Figure 13:
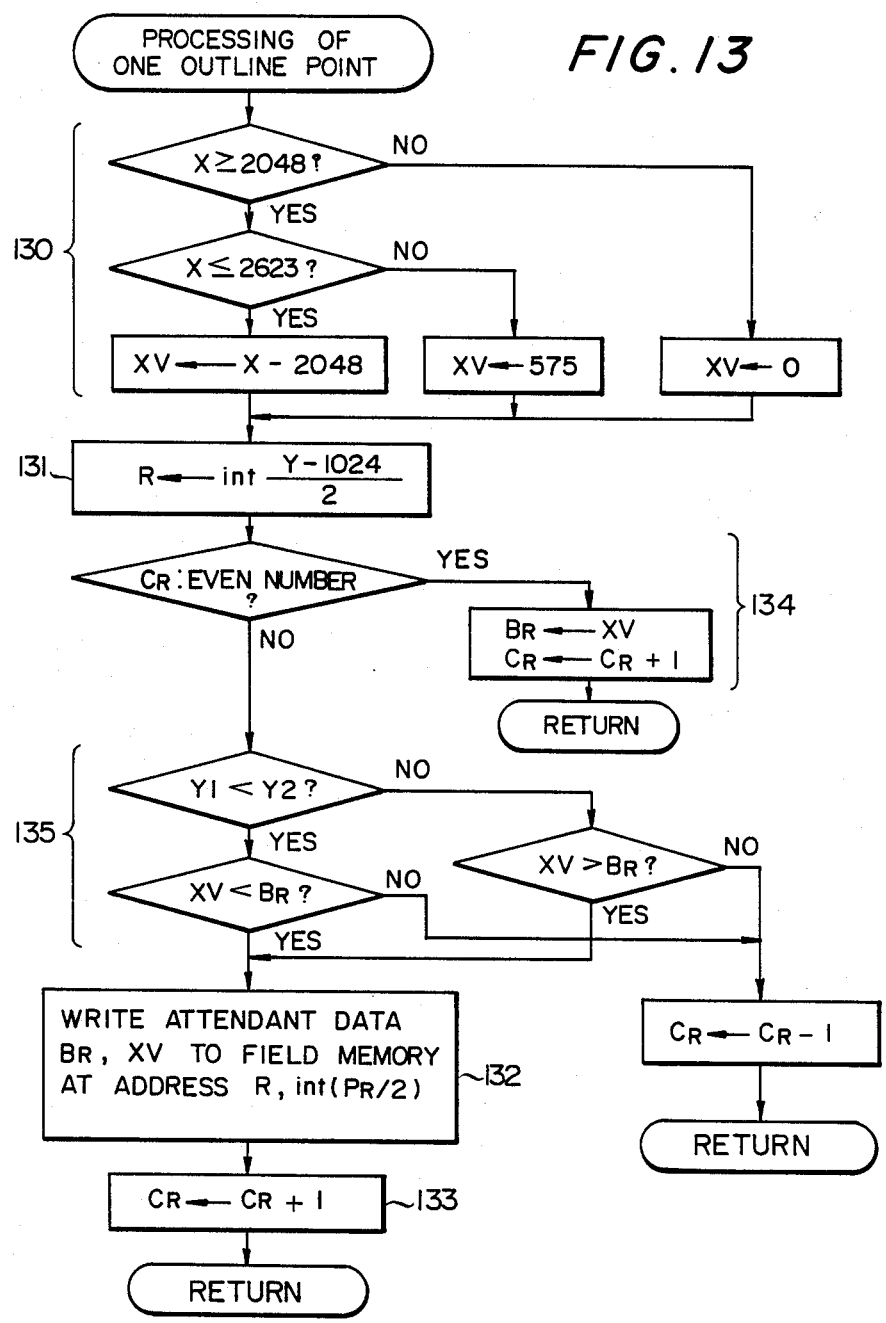

FIG. 13 shows the processing of the contour points shown in FIG. 12 (Step 125).

The apparatus first determines a new coordinate XV relative to an origin which is placed on the CRT screen at its upper and left corner (Step 130). This new coordinate XV is the original coordinate subtracted by 2048.

If the original coorinate is out of the scene, it is set respectively at XV=0 and XV=575 to display the original coordinate on the screen at its opposite ends (third clipping stage).

The new coordinate XV thus determined becomes X-axis coordinate of the contour point which is calculated by the field processor circuit 12.

Thereafter, the calculation is performed to determine an address R at which the contour point is written (Step 131). In FIG. 13, a function int(X) represents the maximum interger not exceeding X while (y-1024) represents a new Y-axis coordinate having its origin placed on the upper and left corner of the screen.

By being addressed by said address R, said contour point XV will be stored in the field memory 42 at its horizontal scan memory area. Further, the count CR of the counter 54 set corresponding to the above memory area is incremented (Steps 132 and 133).

If the count CR of the counter 54 is even, this represents such a state that only the left-hand contour point is determined. Therefore, the determined contour point is temporally stored in the buffer 52 until the right-hand contour point is determined. The count CR of the counter 54 is incremented (Step 134).

The apparatus can display a three-dimensional image as a pseudo three-dimensional image in two-dimensional manner.

The polygon data on the forward side of the stero contour outputted from the image data source 10 include the apex coordinates provided counter-clockwise. On the contrary, polygons located on the backward side of the stereo contour are outputted as data of turned-over polygons which are provided clockwise.

To this end, the apparatus compares the increase and decrease of Y-axis coordinate with the sizes of contour points in combination to eliminate the data of turned-over polygons (Step 135).

The pre-processing circuit 46 and divider circuit 49 operate to handle the operations shown in FIGS. 9 to 11 and the first half of the operation shown in FIG. 12 while the segmenting circuit 50, contour point buffer 52 and contour point counter 54 operate to handle the second half of the operation shown in FIG. 12 and substantially all the operation shown in FIG. 13.

Although the flow chart has been described as to the series processing for simplicity, the apparatus may be operated by a parallel processing or at higher speeds by the use of the pipeline processing system, if required.

(e) Field Memory

The memory circuit 32 includes only the field memory 42 without the attendant data memory 44. This is because the attendant data to be handled are data consisting of relatively less bits such as color codes as described.

The field memory 42 is adapted to store the contour point data of all the polygons indicated in one field and, in the present embodiment, includes a RAM of 28 bits $\times 2^{15}$ (32K) words. The field memory 42 is such that it has its capacity two times as high as that actually required to effect the operation as a dual-port RAM. For such a reason, one operation area has a capacity one-half the total capacity, that is, of 28 bits $\times 2^{15}$ (16K) words. In the present embodiment, CRT is adapted to alternately display the even and odd fields by the use of interlaced scanning. To this end, as shown in FIG. 4(B), the memory space of the field memory 42 is divided into blocks corresponding to the respective scan lines (Y=0, 2, 4...) of the even field or the respective scan lines (Y=1, 3, 5...) of the odd field in the proportion of one-to-one.

As described previously in connection with said specification, the Y-axis coordinates defining one frame scene are of 448 in the light of the arrangement of circuit. Thus, the odd or even number of field includes 224 scan lines. The maximum number of polygons capable of being displayed on one horizontal scan line is of 64.

If it is assumed that the contour point data of one polygon (including contour point pairs and color codes) are stored in one word, therefore, the operation areas actually used in the field memory 42 will have 28 bits $\times 14,336$ ($=64 \times 224$) words.

FIG. 4(A) shows a format for the contour point data to be written in the field memory 42. The contour point data of each of the polygons comprises the total bits equal to 28 bits which includes color codes of 8 bits, X-axis coordinate XL of the left-hand contour points equal to 10 bits and X-axis coordinate XR of the right-hand contour points equal to 10 bits.

The contour point data sequentially outputted from the field processor circuit 12 are written in the respective horizontal scan memory areas specified by Y-axis coordinates in the contour point data according to their priorities sequentially starting from the lowest address. The final memory area will have a termination code written therein.

In all the horizontal memory areas are filled with the contour point data equal to 64, no termination code will be written therein.

As shown in FIG. 4(B), the field memory 42 is controlled in writing and reading of data according to a clock of 3 MHz. When the clock of data outputted from the field processor circuit 12 becomes H-level, the writing is carried out. On the other hand, the reading of data is performed as the clock becomes L-level.

Furthermore, the field memory may be adapted to store one-half or part of the video scene rather than the total scene.

(f) Index Memory

The index memory 36 is adapted to store color codes included in the contour point data for one scan line read from the field memory 42 at addresses corresponding to said priority numbers, as shown in FIG. 5.

The priority number denotes a polygon displayed on one scan line sequentially starting from the highest priority as indicated by "0", "1", "2" and so on.

In the present embodiment, polygons equal to 64 maximum are displayed on one horizontal scan line with the color codes of each of the polygons being consisted of 8-bit data.

the index memory 36 is formed of a RAM having a capacity of memory equal to 8 bits×64 words.

(g) Line Processor Circuit

The line processor circuit 34 synchronizes with the horizontal scanning of the CRT to read the contour point data of the polygons from the field memory 42 at its horizontal scan memory areas to compose and output image signals for the horizontal scanning.

In the present embodiment, the line processor circuit 34 comprises a first line processor circuit 56, a second line processor circuit 58 and a contour point map memory 60.

FIG. 17(A) illustrates a timing chart of the changing operation in the line processor circuit 34.

The first line processor circuit 56 synchronizes with the horizontal scanning of the CRT to read the contour point data from the field memory 42 at its horizontal scan memory areas sequentially in accordance with their priorities.

As the contour point data of each of the polygons are read out, the first line processor 56 generates a priority number.

If it is assumed that the contour point data is to be read from a horizontal scan memory area (Y=20) shown in FIG. 4, the first line processor 56 first reads the contour point data of the polygon A in accordance with its priority and subsequently those of the polygons B and C in the order described.

Simultaneously, the first line processor 56 produces a priority number "0" representative of the contour point data for the polygon A and subsequently the priority numbers "1" and "2" of the polygons B and C in the order described.

Further, the first line processor 56 writes and stores the attendant data included in the contour point data of each of the polygons into the index memory 36 at addresses corresponding to said priority numbers.

If the respective color codes of the polygons A, B and C represent red-, blue- and yellow-colors, they will be written in the index memory 36 at the addresses 0, 1 and 2, respectively.

The reading of the contour point data is performed by the first line processor 56 merely in accordance with their priorities irrespectively of the X-axis coordinates.

Therefore, the apparatus is required to map the contour point pairs included in the read contour point data at the X-axis coordinates.

The line processor 56 utilizes the contour point map memory 60 to map the contour point pairs.

More particularly, the left- and right-hand contour point locations included in the read contour point data of each of the patterns are used as addresses at which the corresponding priority numbers are written and stored in the contour point map memory 60. At the same time, the contour point locations included in the contour point data of each pattern are written and stored in the contour point map memory 60.

Such a mapping of the contour point locations and priority numbers may satisfactorily be performed only by the use of a map memory 62 which will be described.

In the present embodiment, however, the contour point map memory 60 is consisted of the map memory 62 and the sub-map memory 64 to increase the speed of said mapping.

Map Memory

FIG. 15 shows a format for the map memory 62. The map memory 62 has addresses 0–575 corresponding to the number of pixels defining one scan line. One 6-bit memory area is assigned to each of the addresses for storing priority numbers. A priority number produced on each of the reading operations of contour point data from the field memory 42 is stored by using X-axis coordinate of that contour point as an address.

Thus, the map memory 62 functions as a bit map memory for contour points relative to one horizontal scan line.

To permit the overlapping between the left- and right-hand contour points, the map memory 62 comprises an exclusive map memory 62L for the left-hand contour points and an exclusive map memory 62R for the right-hand contour points. If it is assumed that the contour point data of the polygons A, B and C are read out of the field memory 42 at a horizontal scan memory area addressed by y=20, the respective priority numbers 1, 2 and 0 will be stored in the left-hand contour point map memory 62L at addresses XLB, XLC and XLA.

Similarly, the priority numbers 2, 1 and 0 will be written in the right-hand contour point map memory 62R at addresses XRC, XRB and XRA.

The map memory 62 assigns each 6-bit memory area to a group of 576 pixels defining one horizontal scan line. It is thus required to use a RAM having a capacity of memory exceeding at least 6 bits×576 words.

Sub-Map Memory

FIG. 16 shows a format for said sub-map memory 64. The sub-map memory 64 is assigned one-bit memory area as a flag representative of the presence or the contour point corresponding to each of 576 pixels which defines one horizontal scan line.

As in the map memory 62, the sub-map memory 64 comprises an exclusive sub-map memory 64L for left-hand contour points and an exclusive sub-map memory 64R for right-hand contour points to permit the overlapping between the left- and right-hand contour points.

In the sub-map memory 64, 8-bit is used as one word, as shown in FIG. 16.

High order 7 bits in 10-bit display X-axis coordinate are used as an address while the low order 3 bits are utilized to select bits in each of the words.

Since the sub-map memory 64 must assign a one-bit memory area to each of 576 pixels, this memory 64 is required to be a RAM having a capacity of memory exceeding at least 576 bits.

If the map memory 62 is formed such that it can write and read data at higher speeds and has data of contour point positions included in the contour point data, the sub-map memory 64 may be omitted.

Line Processor

Figure 18B:
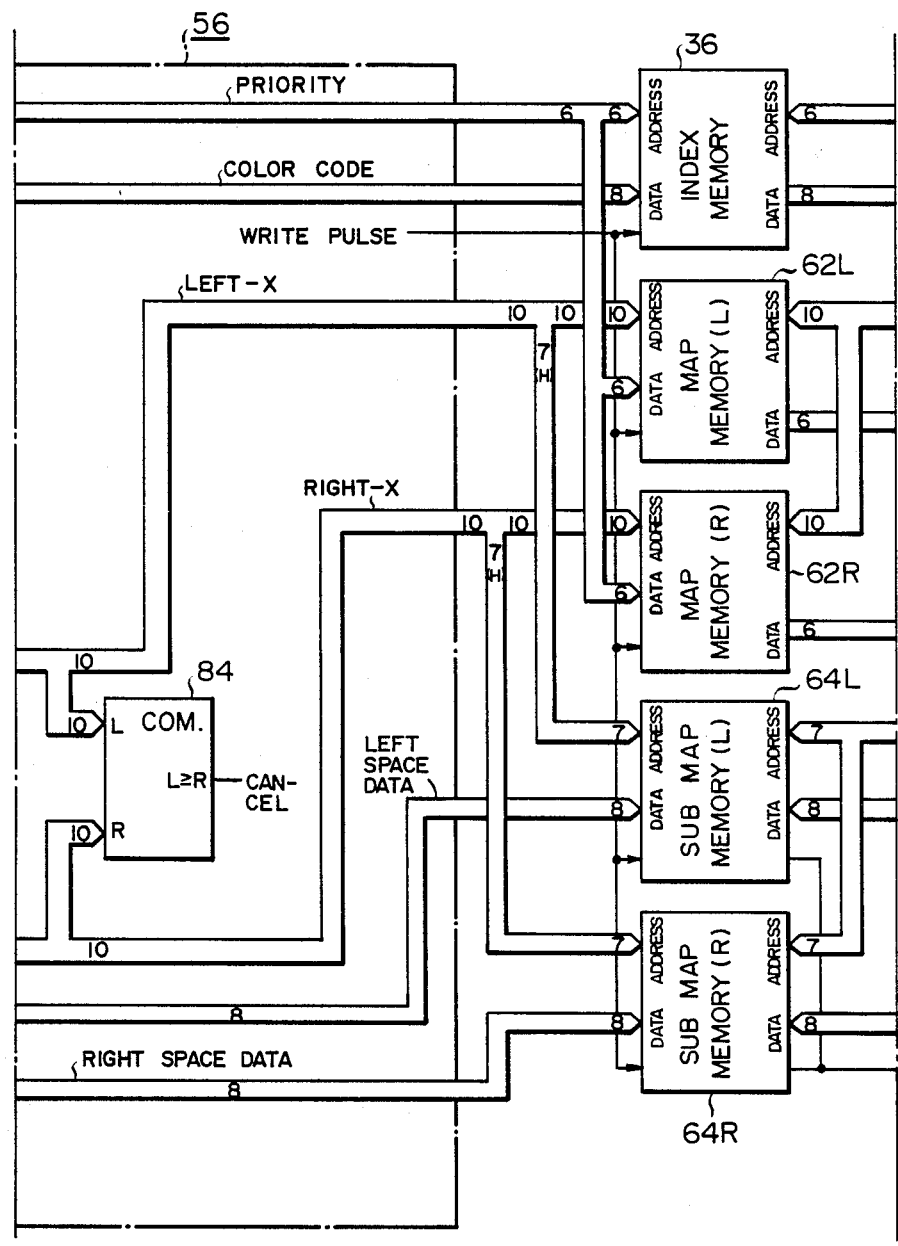
FIGS. 18, 18(A) (B) and (C) is a block diagram showing a first concrete example of the line processor circuit shown in FIG. 5.
Figure 18C:
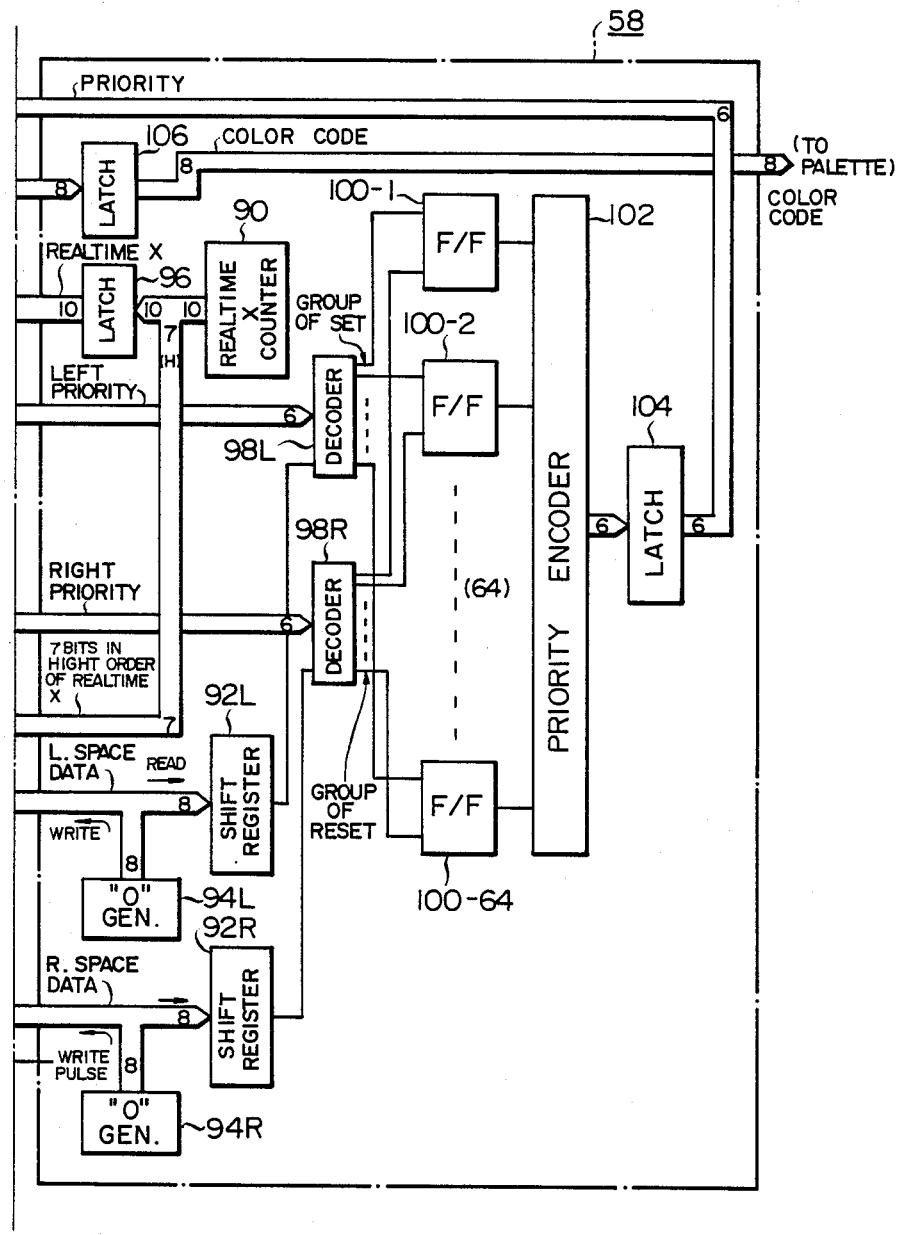

FIG. 18 shows the details of the line processor circuit 34.

First Line Processor

The first line processor 56 comprises a line counter 70 for outputting scan line select signals in synchronism with the horizontal scanning of the CRT and a priority number counter 72 for producing priority numbers sequentially starting from zero. Outputs read from these counters are supplied to the field memory 42 as reading addresses.

As a result, contour point data specified by a priority number will be read from the field memory 42 at a horizontal scan memory area which is specified by a select signal (Y-axis coordinate data).

At this time, color codes included in the read contour point data are latched in a latch circuit 76. High order 7 bits in the respective coordinates XL and XR of the left- and right-hand contour points are inputted to presetable counters 78L and 78R, respectively. Low order 3 bits are inputted in latch circuits 80L and 80R, respectively.

The first line processor 56 is adapted to write and store color codes inputted in the latch circuit 76 into the index memory 36 at their priority numbers as addresses.

Using the left-hand contour point coordinate XL inputted in the up counter 78L and latch circuit 80L and the right-hand contour point coordinate XR inputted in the down counter 78R and latch circuit 80R as addresses, the priority numbers latched in the latch circuit 74 are written and stored in the left- and right-hand contour point map memories 62L and 62R.

The apparatus sets contour point write flags of the left- and right-hand contour point sub-map memories 64L and 64R at "1" using the left- and right-hand contour point coordinates XL and XR as addresses.

If it is assumed that the contour point data are read from a horizontal scan memory area indicated by y=20 in FIG. 4, therefore, the data of the polygons A, B and C will be written in the index memory 60, map memory 62 and sub-map memory 64, as shown in FIGS. 5, 15 and 16.

There is a problem which should be considered on writing of such data. This is that when the contour point data of plural polygons are continuously read out, a plurality of polygons which have right-hand contour points or left-hand contour points located on the same address may exist.

In such a case, it is required to shift the left- or right-hand contour points of a polygon having a lower priority rightwardly or leftwardly.

To accomplish such a shifting, the line counter 56 comprises a left-hand contour point shifting circuit 82L, a right-hand contour point shifting circuit 82R and a comparator circuit 84.

If it is assumed that 10-bit data "0101101010" are read as X-axis coordinate for a left-hand contour point, the high order 7 bits "0101101(=45)" in the 10-bit data are inputted in the sub-map memory 64L through the counter 78L to address the k-th word (k=0101101=45), as shown in FIG. 19.

The low order 3 bits (010=2) in said 10-bit data are inputted in the latch circuit 80L as select signals to address the third bit in the k-th word.

As shown in FIG. 19, the addressed k-th word is then read and supplied from the sub-map memory 64L to the left-hand shifting circuit 82L. Thereafter, the left-hand contour point shifting circuit 82L discriminates whether or not the contour point data has already been written at a position "010" addressed by the latch circuit 80L (a bit shown by arrow  in FIG. 19).

If the contour point data has already been written at the bit as shown by arrow 1 in FIG. 19, the left-hand contour point data shifting circuit 82L will detect a bit among bits which is equal to zero in the word and which has a bit select signal larger than one and yet is nearest the bit select signal "101" in one.

Such bit select signal as satisfies such a condition includes a bit addressed by a bit select signal at the third position measured rightwardly from 1.

Thus, the left-hand contour point shifting circuit 82L will output "101" as new low order 3 bits data.

As a result, the apparatus will output 10-bit data "0101101101" as a new left-hand contour point X-axis coordinate which has been subjected to shifting.

The shifting for right-hand contour points can similarly be performed by the use of the right-hand contour point shifting circuit 28R. The right-hand contour point shifting is directed to smaller X-axis coordinates in contrast with the left-hand contour point shifting.

These shiftings are initiated at the same time as the contour point pairs are read from the field memory and yet performed independently and parallel to each other.

On completion of both the shifting operations, new shifted left- and right-hand contour points are utilized to write data into the map and sub-map memories 62, 64.

If a word K outputted from the sub-map memeories 64L and 64R includes no bit to be detected, each of the shifting circuits 82L and 82R sets an output LFIND or RFIND at a level equal to zero. The respective one of the counters 78L and 78R is incremented or decremented to read read from a new word in the sub-map memory 64L or 64R.

The left-hand contour point shifting circuit 82L judges that 3-bit input is "000" while the right-hand contour point shifting circuit 82R discriminates that 3-bit input is "111" . Thus, the optimum addresses can be detected as described hereinbefore.

During the shifting process, X-axis coordinate of the left-hand contour point may be equal to or larger than that of the right-hand contour point. In such a case, the comparator circuit 84 outputs a cancel signal "1" which is used to make the contour pair being handled invalid and to arrest the writing to the memories.

The line processor 56 is thus in dormant state until new horizontal scanning is initiated as a termination code is read from the field memory 42 or when 64 contour points have been read.

On start of the new horizontal scan, the line counter 70 outputs a signal used to select a horizontal scan memory area corresponding to a vertical scan position in the horizontal scan. Thus, the process of reading contour point data will be initiated in the same manner as described.

Second Line Processor

After data have been written into the memories 60, 62 and 64 for one horizontal scan line, the second line processor functions to compose image signals included in the one horizontal scan line.

FIG. 17(B) shows a timing chart for the second line processor 58.

As shown in FIG. 18, the second line processor 58 comprises a counter 90 adapted to output X-axis coordinate representative of a horizontal scan location on CRT as 10-bit data. High order 7 bits in the X-axis coordinate outputted from the counter 90 are applied to the sub-map memories 64L and 64R as "reading address". At the same time, the X-axis coordinate itself from the counter 90 is supplied to the map memories 62L and 62R as "reading address".

From the sub-map memories 64L and 64R are read contour point writing flags equal in number to eight which have been written in a word addressed by the reading address, as parallel data. The read flags are subjected to parallel-series conversion by shift registers 92L and 92R while matching a timing at which data are read from the map memories 62L and 62R. The converted flags are sequentially applied to decoders 98L and 98R.

In association with such a reading operation, zero-generation circuits 94L and 94R are actuated to clear the word just read in the sub-map memory.

Each of the map memories 62L and 62R utilizes X-axis coordinate inputted through a latch 96 as address to supply left-or right-hand contour point priority number written therein to the decoder 98L or 98R.

The left-hand contour point decoder 98L discriminates that the left-hand contour point priority number outputted from the map memory 62L is valid, only when a flag "1" representative of the writing of the left-hand contour point data is outputted from the register 92L. A set of flip flops 100 specified by this priority number are then set at "1".

Similarly, the right-hand contour point decoder 98R discriminates that the right-hand contour point priority number outputted from the map memory 62R is valid, only when a flag "1" representative of the writing of the right-hand contour point data is outputted from the shift register 92R. The flip flop set 100 specified by this priority number will then be reset at "0".

Said flip flop set 100 include 64 flip flops 100-1, 100-2, 100-3, ... 100-64 to match the number of polygons displayable on one horizontal scan line, these flip flops being arranged in the order described, starting from one having the highest priority.

Therefore, if it is assumed that a horizontal scan line shown by y=20 in FIG. 4(A) is to be scanned, the first flip flop 100-1 can be set only when the horizontal scan is being performed between the contour points XLA and XRA of the polygon A having the highest priority.

The second flip flop 100-2 can be placed at its set state only when the horizontal scan is being made between the contour points of the polygon B having the second high priority.

Similarly, the third flip flop 100-3 can be brought into its set state only when the horizontal scan is being effected between the contour points of the polygon C.

A priority encoder 102 is provided to discriminate which flip flop 100 placed in the set state has the highest priority, based on the outputs from the respective flip flops 100-1, 100-2, 100-3, ... 100-64. A priority number corresponding to the flip flop having the highest priority is then applied, as "attendant data reading address", to the index memory 60 through a latch 104 to prepare a delay time.

If it is assumed that a line shown by y=20 in FIG. 4 is to be scanned, the priority encoder 102 generates, at its output, a priority number "1" when the horizontal scan is being made on CRT between XLB and XRB and a priority number "0" when the horizontal scan is being performed between XLA and XRA.

The priority numbers thus outputted are then used in the index memory 60 as "reading address" to apply the corresponding color code to the color palette memory 38.

For example, it color codes of red, blue and yellow have been written in the index memory 60 as shown in FIG. 5, the blue color code will be outputted from the index memory 60 when a priority number "1" is being outputted from the priority encoder 102 (XLB≦X<XRB). When a priority number "0" is being outputted from the priority encoder 102 (XLA≦X<XRA), the red color code will be outputted from the index memory 60.

When the color codes thus outputted from the index memory 60 depending on X-axis coordinates (displayed pixel positions) which are outputted from the counter 90, image signals used to display the polygons A and B with the specified colors will be applied to CRT 40.

By repeating such an operation in synchronism with the horizontal scan, a desired image may be displayed on CRT 40 based on the polygon data from the image data source 10.

C2: Second Concrete Example

Another embodiment of the line processor circuit 34

Referring to FIGS. 20 to 23, there is shown a second concrete example of the line processor circuit 34 shown in FIG. 1.

The line processor circuit 34 according to this embodiment is characterized by that attendant data reading addresses may be created to compose image signals without need of the map memory 62 and sub-map memory 64.

Figures 20, 20A:
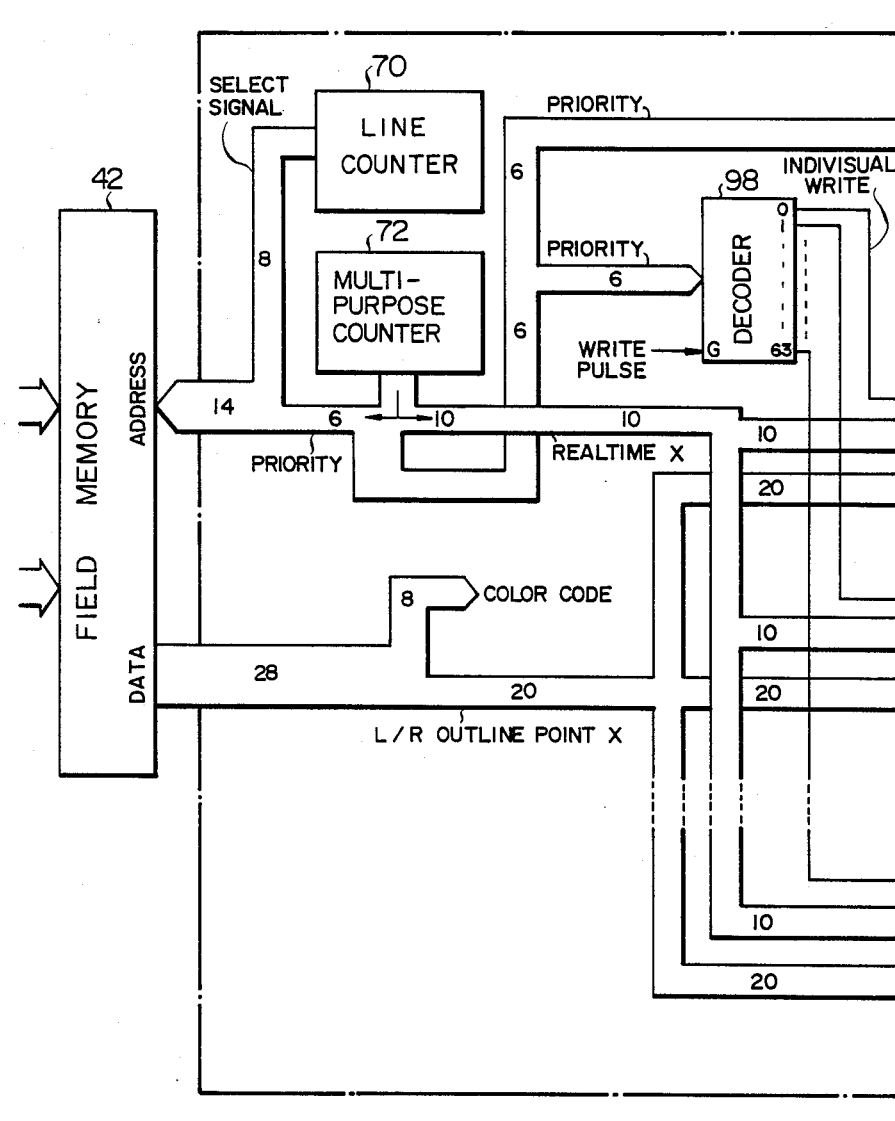
FIGS. 20,20(A) and (B), 21,22 and 23(A) and (B) illustrate a second concrete example of the line processor circuit shown in FIG. 1.
Figure 20B:
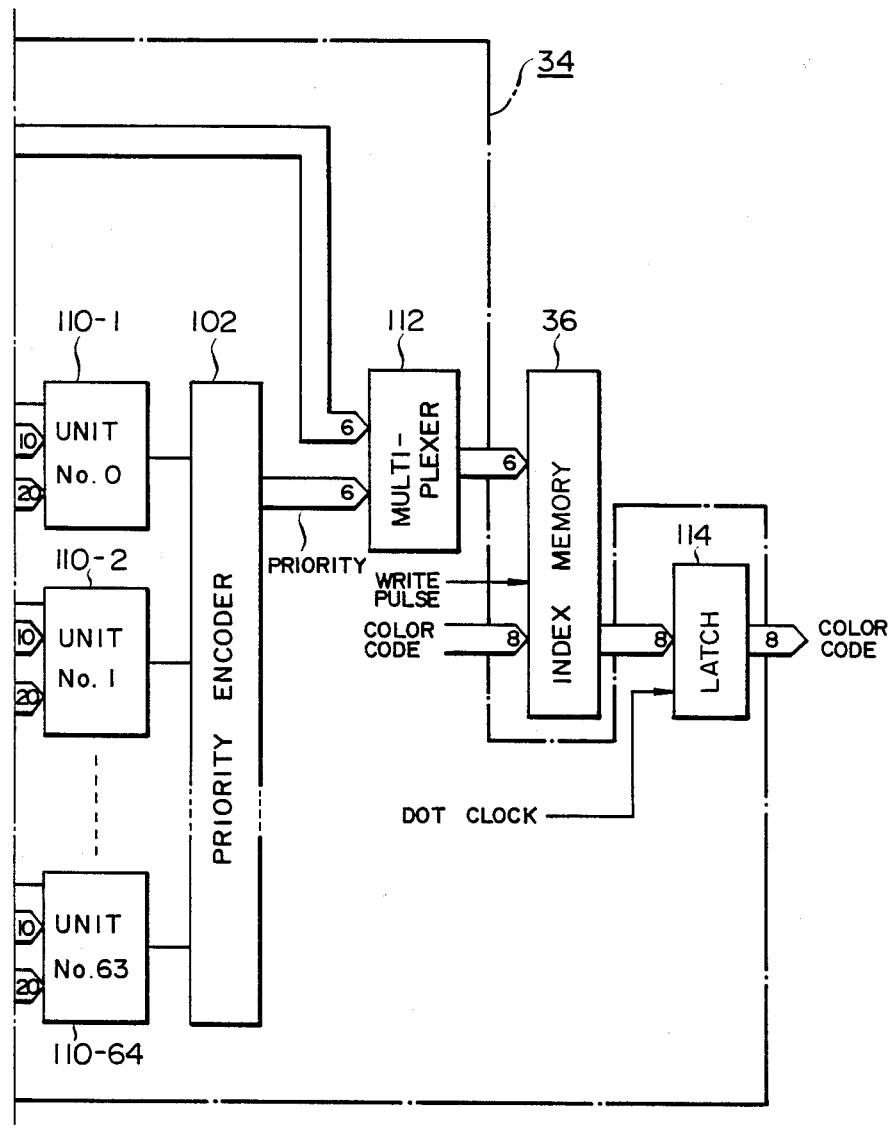

FIG. 20 shows a concrete circuit diagram of the line processor circuit according to this embodiment. In this figure, parts similar to those of the first concrete example shown in FIG. 18 are indicated by similar reference numerals and will not be further described.

FIG. 21 illustrates a timing chart for the changing operation of the line processor circuit 34. As will be apparent from this figure, the apparatus causes the line processor circuit 34 to perform its changing operation at a time proceeding from a horizontal display term signal in CRT by about 81.4 ns.

The writing of contour point data from the field memory 42 is made based on select signals outputted from the line counter 70 and priority numbers outputted from the counter 72, as in the first concrete example.

To store the read contour point data, the apparatus comprises a plurality of unit circuits 110 in addition to the index memory 36.

The index memory 36 is such that it stores color codes included in the contour point data by using the priority numbers from the counter 72 as addresses.

The unit circuits 110 is subjected to writing of left- and right-hand X-axis coordinates included in the contour point data and of 64 in number matching the number of polygons displayable on one horizontal scan line. To address each of the unit circuits 110, the apparatus is provided with a decoder 98.

The decoder 98 is adapted to apply reading pulses sequentially to the first unit circuit 110-1, the second unit circuit 110-2, ... the last unit circuit 110-64 using the priority numbers outputted from the counter 72 as addresses.

For example, if the contour point data of the respective polygons A, B and C shown in FIG. 4(A) are sequentially read from the field memory 42, the contour point pairs of the polygon A having the highest priority are written in the first unit circuit 110-1 and the contour point pairs of the polygons B and C having the second and third high priorities will be written in the second and third unit circuits 110-2 and 110-3, respectively.

On writing into the memory, the counter 72 functions as a priority number generating counter. However, the counter 72 functions as a X-axis coordinate real-time displaying counter which is adapted to output 10-bit data representative of "present horizontal scan location" when the display is made based on the written data.

The switching of such counter operations may be carried out by the use of a controller (not shown).

Figure 22:
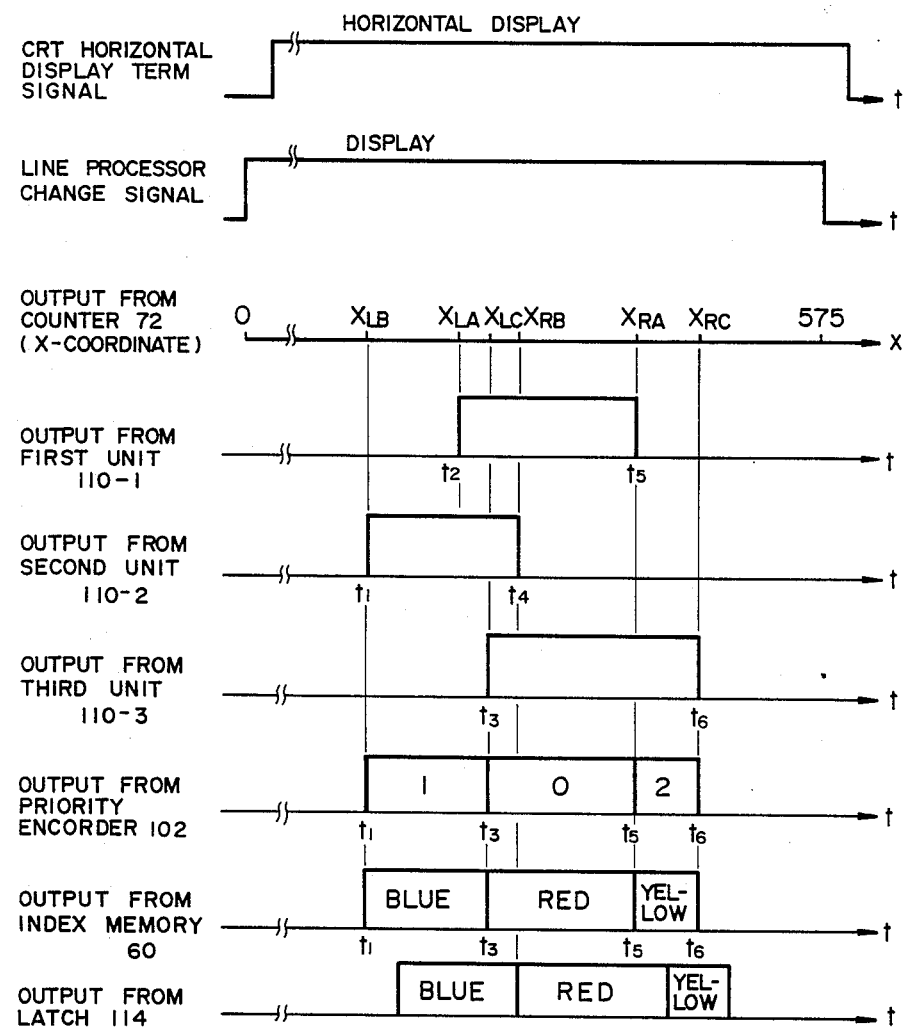
Figure 23:
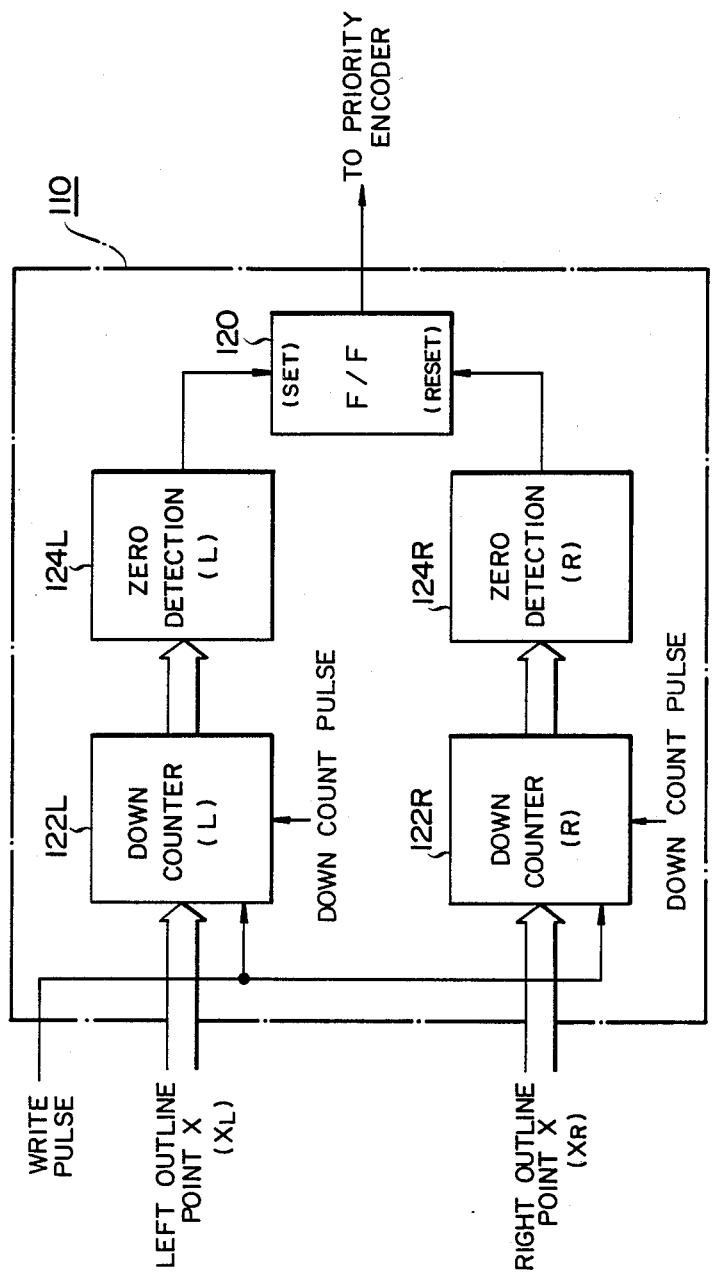

FIG. 22 shows a timing chart when the apparatus performs its display operation based on the data written in the memories.

X-axis coordinate representative of a present horizontal scan location has been applied from the counter 72 to each of the unit circuits 110-1, 110-2, ... 110-64.

Only when the present horizontal scan location is within the range of the written contour point pair, each of the unit circuits 110-1, 110-2, ... 110-64 provides a H-level signal to the priority encoder 102.

If it is assumed that contour point pairs (XLA, XRA), (XLB, XRB) and (XLC, XRC) of the respective polygons A, B and C are written respectively in the unit circuits 110-1, 110-2 and 110-3, H-level signals will be outputted from the respective unit circuits 110-1, 110-2 and 110-3 under the timing shown in FIG. 22, depending on X-axis coordinates from the counter 72.

The priority encoder 102 pre-assigns priority numbers 0, 1, 2, ... 63 to the unit circuits 110-1, 110-2, ... 110-64, respectively. When a unit circuit having the lowest priority among the unit circuits 110 which have outputted H-level signals is selected, its priority number is then applied to the index memory 60 wherein it is used as "reading address".

When the contour point pairs of the polygons A, B and C have been written into the unit circuits 110-1, 110-2 and 110-3 as described hereinbefore, the priority encoder 102 will output the priority numbers in the order described by "1", "0" and "2" in association with the outputs from the respective unit circuits 110 as shown in FIG. 22.

In the present example, the apparatus comprises a multiplexer 112 at the address input of the index memory 60, the multiplexer 112 being such that it selects the output of the counter 72 on the writing operation into the memories and also the output of the priority encoder 102 on the reading operation from the memories.

As a priority number is outputted from the priority encoder 102, the index memory 60 provides a color code specified by that priority number to the color palette memory through a latch circuit 114.

If it is assumed that red, blue and yellow color codes have been written in the index memory 60 as shown in FIG. 14, the index memory 60 will output the blue, red and yellow color codes through the latch circuit 114 correspondingly during the generation of priority numbers "1", "0" and "2" in the priority encoder 102.

In such a manner, the line processor circuit 34 can synchronize with the horizontal scans on CRT to compose image signals well on each of the horizontal scans.

FIG. 23(A) shows the concrete arrangement of one of the unit circuits 110 which comprises a pair of left- and right-hand contour point registers (116L, 116R), a pair of coincidence detection circuits (118L, 118R) and a flip flop 120.

Left- and right-hand contour point X-axis coordinates read from the field memory 42 are written into the left- and right-hand contour point registers 116L and 116R, respectively.

As the display operation is initiated based on the written data, the left-hand contour point coincidence detection circuit 118L compares the left-hand contour point X-axis coordinates written in the register 116L with X-axis coordinates outputted from the counter 72. If both are coincident, the flip flop 120 is set at "1".

The right-hand contour point coincidence detection circuit 118R compares the right-hand contour point X-axis coordinates written in the register 116R with X-axis coordinates outputted from the counter 72. If both are coincident, the flip flop 120 is set at "0".

Thus, the flip flop 120 will output H-level signals to the priority encoder 102 only when X-axis coordinates outputted from the counter 72 are within the range of left- and right-hand contour points.

FIG. 23(B) shows another concrete example of said unit circuit 110. This unit circuit 110 comprises a pair of left-and right-hand contour point down counters (122L, 122R), a pair of zero detection circuits (124L, 124R) provided to the resepective down counters and a flip flop 120.

As the contour point data are read from the field memory 42, left- and right-hand contour point X-axis coordinates includes in the contour point data are written into the down counters 112L and 122R, respectively.

These down counters 122L and 122R are initiated to actuate at the same time as the display operation of the line processor circuit 34 is initiated.

One of the zero detection circuits 124L is adapted to set the flip flop 120 at the same time as the output of the left-hand contour point down counter 122L becomes zero. The other zero detection circuit 123R is adapted to reset the flip flop 120 at the same time as the output of the right-hand contour point down counter 122L becomes zero.

In the present example, the operation of each of the counters 122 may be stopped at the same time as its count becomes zero. Furthermore, the flip flop 120 may be omitted by providing counter stoppage detecting means on the side of the priority encoder.

The present example has been described as to one wherein the contour point data of the polygones are read form the horizontal scan memory areas of the field memory 42 sequentially starting from the highest priority.

Even if the contour point data are written in the field memory 42 sequentially starting from the lowest priority in contrast with the above description, the apparatus may be actuated to read the contor point data sequentially starting from the lowest priority and to generate the corresponding priority number.

If it is assumed that the contour point data of the polygons A, B and C are written in a horizontal scan memory area as shown by Y=20 in FIG. 4, sequentially starting from the lowest priority, the contour point data will be read in the order starting from the polygon C and at the same time generate the priority numbers of the polygons in the order described in "2", "1" and "0".

The priority numbers may be generated in the order described in "0", "1" and "2" if the reading operation of the contour point data is carried out in the reverse manner as that of the writing.

In addition, there is a case where the contour point data are written in the horizontal scan memory areas of the field memory 42 together with exclusive priority data. In such a case, the line processor 34 may be arranged to read the contour point data sequentially and to generate priority numbers based on the priority data included in the contour point data.

C3: Third Concrete Example

Other Embodiment of Field Memory 42

In accordance with the present invention, the field memory 42 includes a plurality of horizontal scan memory areas corresponding to the number of horizontal scan lines.

As seen from FIG. 4(B), the horizontal scan memory areas may be provided by equally dividing the memory space in the field memory 42 into unit blocks simply corresponding in number to all the scan lines.

When so done, however, each of the blocks will be limited in memory capacity and the number of polygons displayable on one horizontal scan line will be limited by the memory capacity of each of the blocks. For such a reason, there is frequently created such a state that a block is in its overflow condition while maintaining many empty areas in the remaining blocks. This causes the efficiency of the memory to reduce.

To overcome such a problem, it is preferred to form each of the horizontal scan memory areas into a complete discontinuous type or a semi-discontinuous type such that its memory capacity can be set flexibly.

Complete Discontinuous Type

FIG. 24 shows a preferred example of the complete discontinuous type field memory 42 so formed. In this figure, the memory image of the field memory 42 is depicted such that its memory capacity per scene includes 16,384 ($=2^{14}$) words and the number of scan lines is equal to 224 per field except blanking.

Each word in the field memory 42 includes an item representative of "next address". Therefore, the following line processor circuit 34 can continuously read the contour point data for one line.

Since the field memory 42 includes 16,384 ($=2^{14}$) words per scene as described, it requires 14-bit address to effect the next addressing operation in reading.

If Memory spaces of 8 bits, 10 bits, 10 bits and 14 bits are respectively assigned to the attendant data, left-hand contour point, right-hand contour point and next address, there is required the total memory space of 42 bits per word.

To write data in such a field memory 42, the field processor circuit 12 must include 224 slave pointers corresponding to the number of horizontal scan lines on each CRT in one-to-one proportion, and a single master pointer.

Each of the slave pointers is used to specify the next address to write the contour point data in the same horizontal scan memory area.

The master pointer is used to set an address to be written at "next address" column, relating a word addressed by the slave pointer.

The master pointer is controlled to output the youngest address among address areas which are not specified by the slave pointers and yet do not include data written therein.

Write operation of the contour point data made by the use of the master and slave pointers will now be described.

Prior to the write of contour point data, the master and slave pointers are first initialized. Thus, the slave pointers specify the preceding addresses 0, 1, 2 . . . 223 in the corresponding horizontal scan memory area, respectively. The master pointer specifies an address 224.

When the field processor circuit 12 subsequently begins to calculate the contour point data, the calculated contour point data will be written to a horizontal scan memory area addressed by y-axis coordinate thereof in the following procedure:

First of all, when the field processor circuit 12 calculates the first contour point data on a line, a slave pointer corresponding to the y-axis coordinate of the first contour point data specifies a write address in the field memory 42.

The calculated contour point data are respectively written into "attendant data", "left-hand contour point" and "right-hand contour point" columns at the specified address. In addition, the present address "224" indicated by the master pointer is written into "next address" column in the specified word.

Next, said slave pointer is switched to indicate the same address "224" as that of the master pointer written in the "next address" column. In association with this, the address outputted from the master pointer is incremented to "225".

As a result, this slave pointer will write the contour point data at "attendant data", "left-hand contour point" and "right-hand contour point" columns of a word specified by the address "224" when the contour point data on the same line are subsequently calculated. At the same time, a presently indicated address in the master pointer is written at "next address" column.

On termination of this write operation, the slave pointer will specify a new address in the master pointer written at the "next address" column. In association with this, the address outputted from the master pointer is incremented by one.

In such a manner, the field memory 42 writes a termination code at the address indicated by each of the slave pointers as the write operation of the contour point data of all polygons is terminated.

In such an arrangement, the horizontal scan memory areas will function as a series of memory areas connected by the addresses written at the "next address" columns of the respective words.

If it is assumed that the line processor 34 reads the contour point data from a horizontal scan memory area corresponding to a scan line m, the contour point data written at this horizontal scan memory area will continuously be read with reference to the "next address" using the address m of the field memory as an origin until a termination code is detected.

Figures 25, 25A:
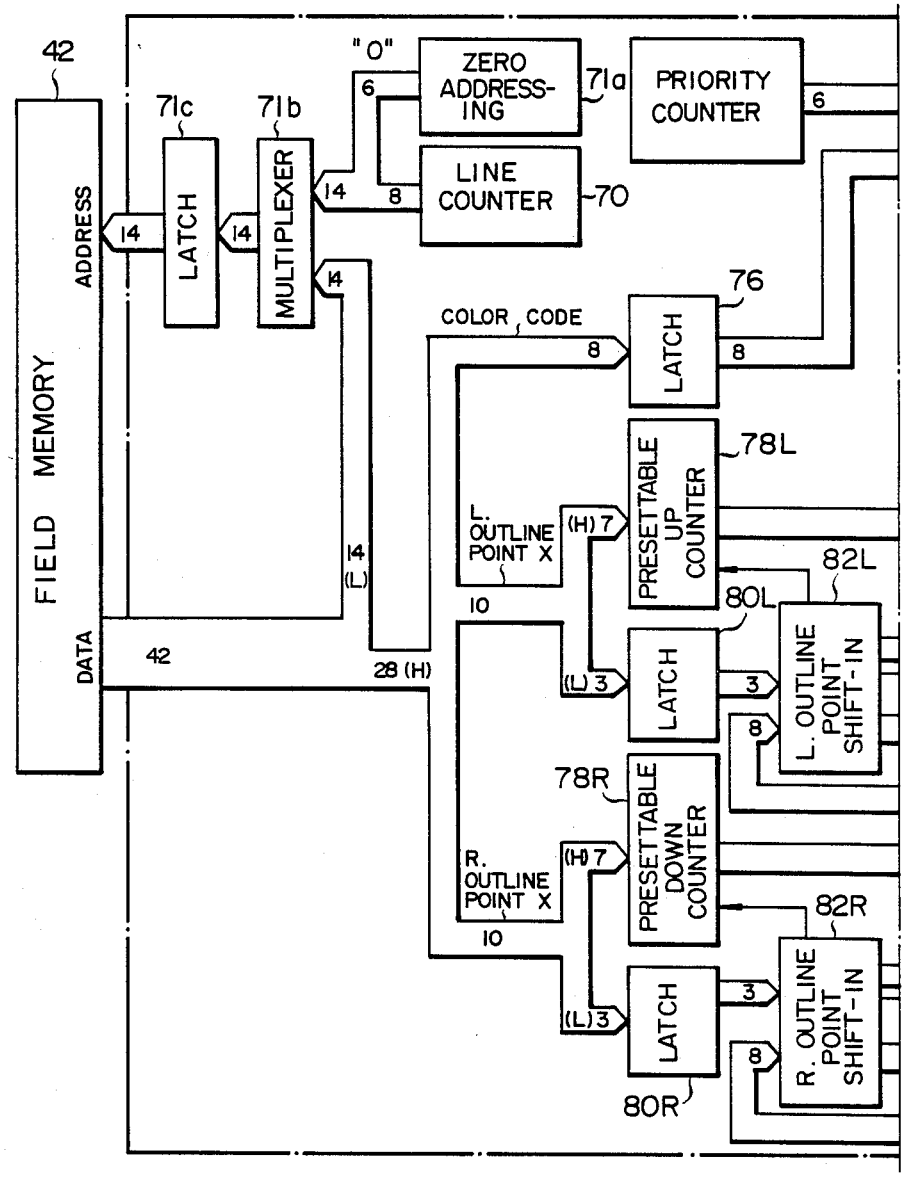
FIGS. 25,25(A) and (B), 26,26(A) and (B) illustrate a line processor circuit used relative to the field memory shown in FIG. 24.
Figure 25B:
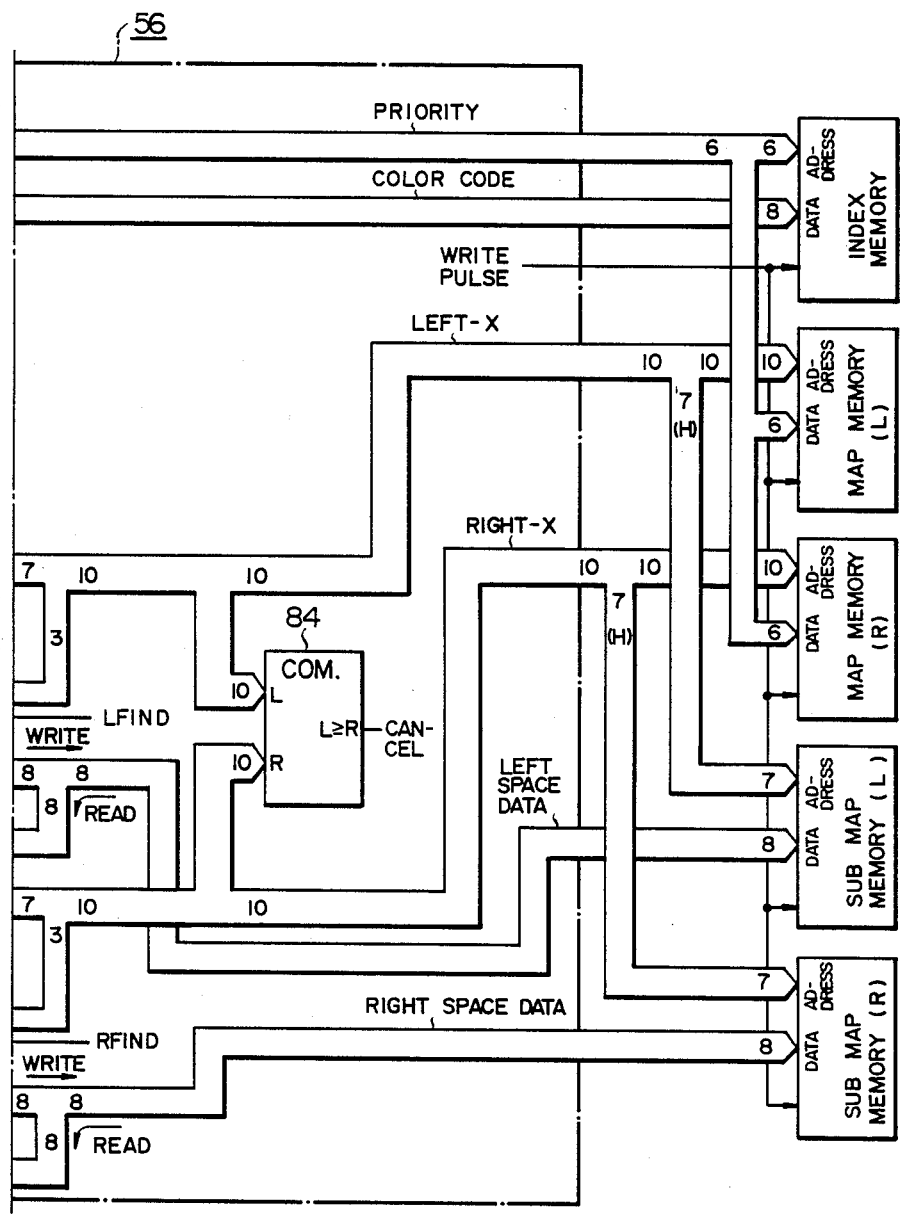
Figures 26, 26A:
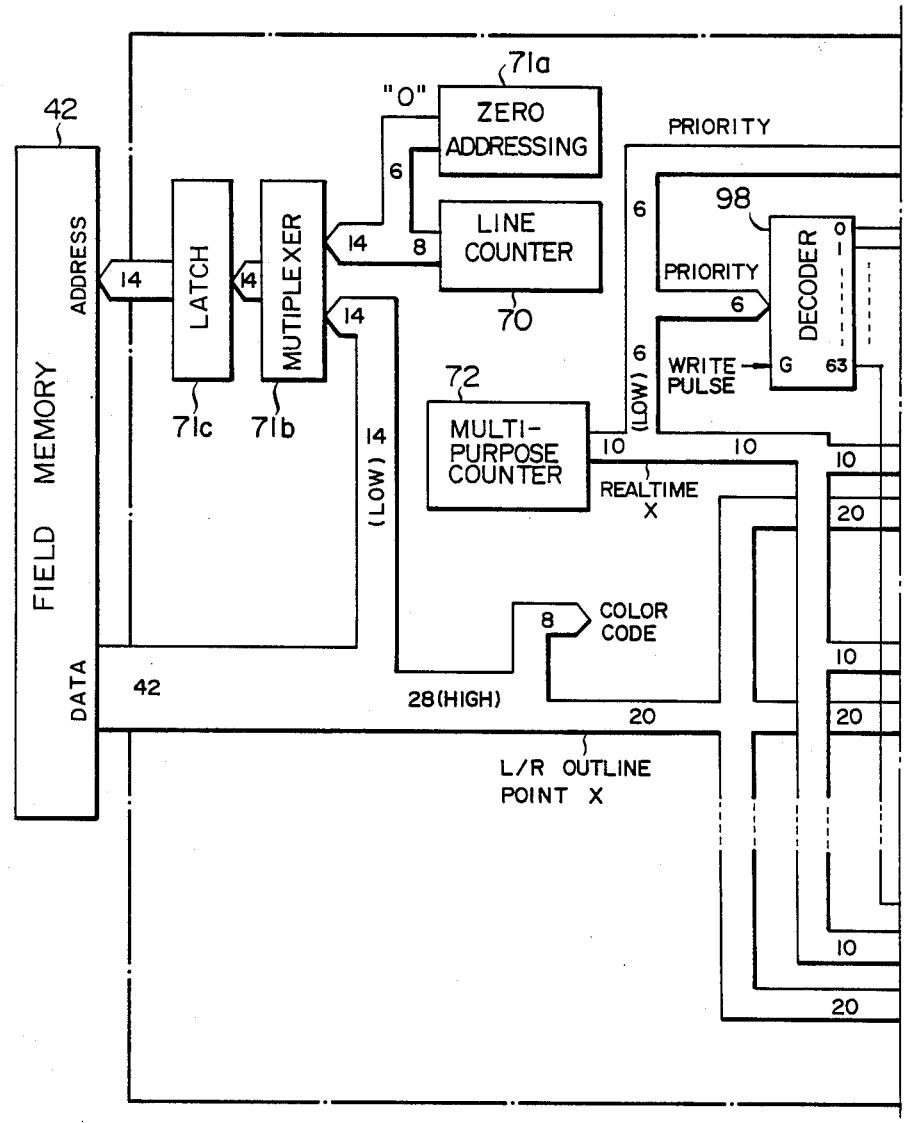
Figure 26B:
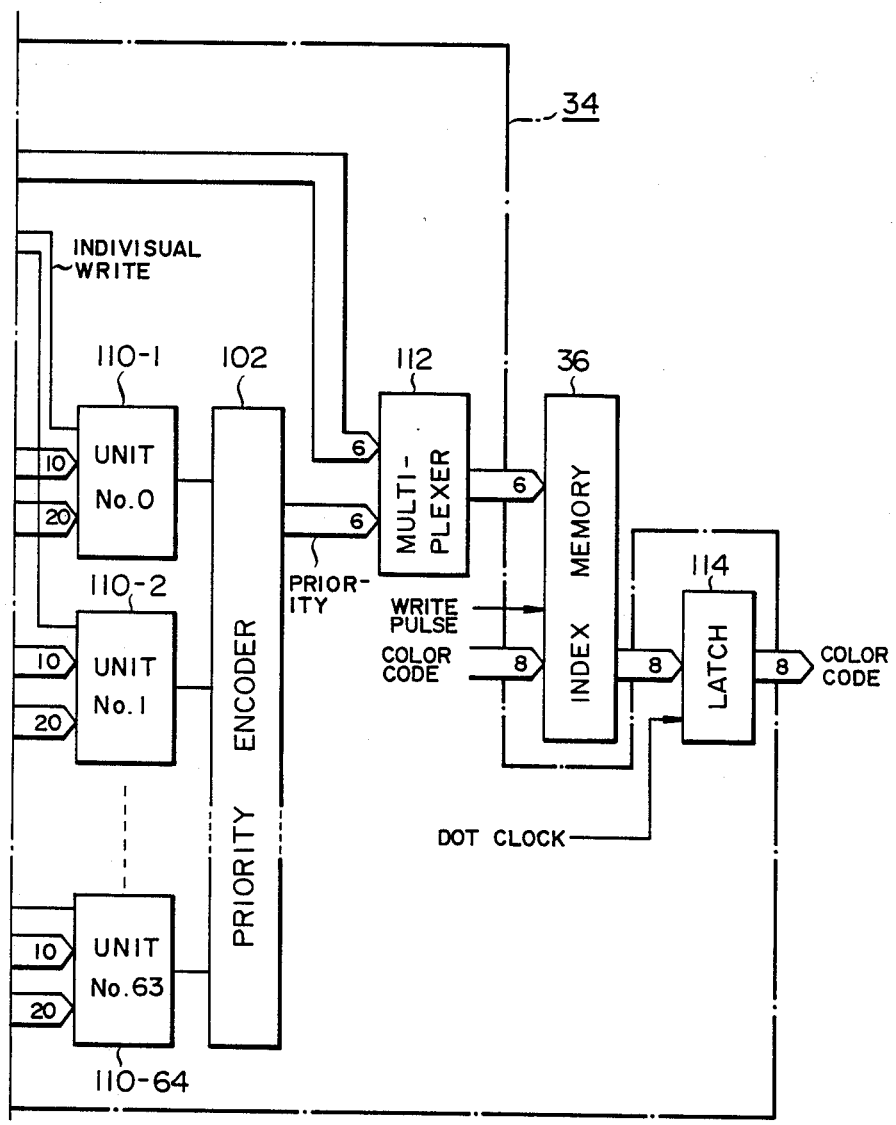

FIGS. 25 and 26 illustrate examples of the line processor circuit 34 used relative to the field memory 42 which is formed as just described.

FIG. 25 shows a modification of the first line processor 56 in the line processor circuit 34 described as the first concrete example while FIG. 26 indicates a modification of the line processor circuit 34 described as the second concrete example. In each of these figures, parts corresponding to those of the first and second concrete examples are denoted by similar reference numerals and will not further be described.

The line processor circuit 34 comprises a line counter 70 actuated in synchronism with the horizontal scan in CRT and adapted to output a select signal (Y-axis coordinate data) relative to the corresponding scan line, and a zero addressing circuit 71a adapted to output zero addressing 6-bit data relative to the corresponding scan line. Both the outputs are then applied to the field memory 42 through multiplexer 71b and latch circuit 71c using the forwardmost word in the horizontal scan memory area as read address.

As a result, the contour point data will begin to be read from the forwardmost word in the horizontal scan memory area specified by the select signal (Y-axis coordinate data).

At the same time, the apparatus outputs the next 14-bit address written at the "next address" column of this read word, this address being in turn applied to the multiplexer 71b.

If it is assumed that a select signal for the scan line m is outputted from the line counter 70 of each of the line processor circuits 34 shown in FIGS. 24 and 25, the counter point data will be read one after another from the horizontal scan memory area m with reference to the "next address" column unitl a termination code is detected, using the address m of the field memory 42 as an origin.

Semi-Discontinuous Type

If the total memory capacity of the horizontal scan memory areas is set to be flexible completely as shown in FIG. 24, however, there is created a new problem in that the number of the component units defining one word is increased from 28 bits to 42 bits to increase the total capacity of the field memory 42 about 1.5 times as large as the original capacity thereof since 14 bits are assigned to the "next address" column.

To overcome such a problem, it is preferred that the memory capacity of the horizontal scan memory areas is of a semi-discontinuous type.

Figure 27:
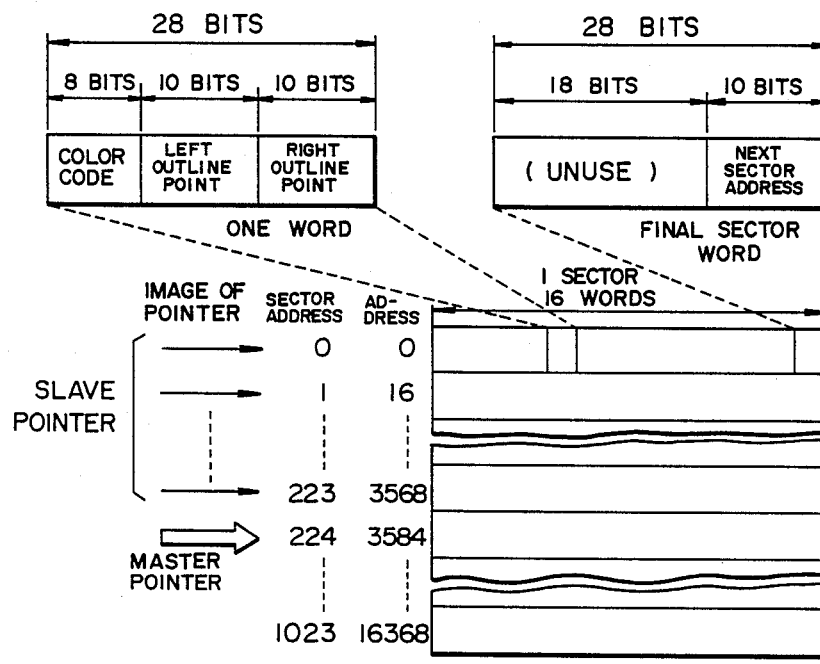
FIG. 27 illustrates another concrete example of the field memory shown in FIG. 1.

FIG. 27 shows an example of the field memory 42 thus arranged.

The field memory 42 has its memory space equally divided into sector blocks each defined by a plurality of words. than at least that of all the scan lines. In the illustrated example, the memory space of the field memory 42 is divided into 1024 sector blocks.

Each of the sector blocks includes its final word assigned to "next sector address".

The sector address is one for specifying each of the sector blocks and represented by the forwardmost word of each of the sector blocks divided by the number of words in that sector block.

In the illustrated example, the capacity of the field memory relative to the capacity of one scene is equal to 16,384 ($=2^{14}$) words and the number of words per sector block is set to be set equal to 16 ($=2^4$). As a result, the number of sector blocks per scene becomes 1024 ($=2^{10}$) and the sector address is indicated within the range of 0–1023.

Writing operation of the contour point data relative to the field memory so formed will be described below.

To perform such a writing operation, the field processor circuit 12 should be provided with 224 slave pointers corresponding to the number of scan lines and a single master pointer.

In the illustrated example, thus, each of the salve pointers includes a plurality of words. For such a reason, it is to be noted that each of the slave pointers corresponding to the scan lines indicates an address assigned to each of the words while the master pointer indicates a sector address assigned to each of the sector blocks.

As the field processor circuit 12 is initiated to calculate the contour point data, the slave and master pointers are initialized.

As a result, each of the slave pointers will indicate one of the forwardmost addresses 0, 16, 32, . . . 3568 in each of the secotr blocks 0, 1, 2, . . . 223 while the master pointer will provide a sector address 224.

Subsequently, as the output of the contour point data is initiated, each of the outputs are written sequentially at an empty word specified by a slave pointer corresponding to its Y-axis coordinate. Each of the slave pointers increments its address and specifies the next word when each write of the contour point data is terminated.

In such a manner, the writing of the contour point data for each sector block is advanced in the same manner as shown in FIG. 4(B).

If a slave pointer specifies the final word in a sector block and after the contour point data to be written herein have been outputted, the following process will be performed:

First of all, an output value of the master pointer, for example, 224 is written at an address indicated by a slave pointer as "next sector address".

The forwardmost address of a sector block specified by the master pointer is then set at the slave pointer. At the same time, the sector address outputted from the master pointer is incremented by one.

Thereafter, the aforementioned contour point data are sequentially written at each of the addresses specified by the slave pointers at each which time the address of the slave pointers is incremented by one.

In such an arrangement, the field memory 42 can very be reduced with respect to the number of bits per word in comparison with the field memory shown in FIG. 24.

Figures 28, 28A:
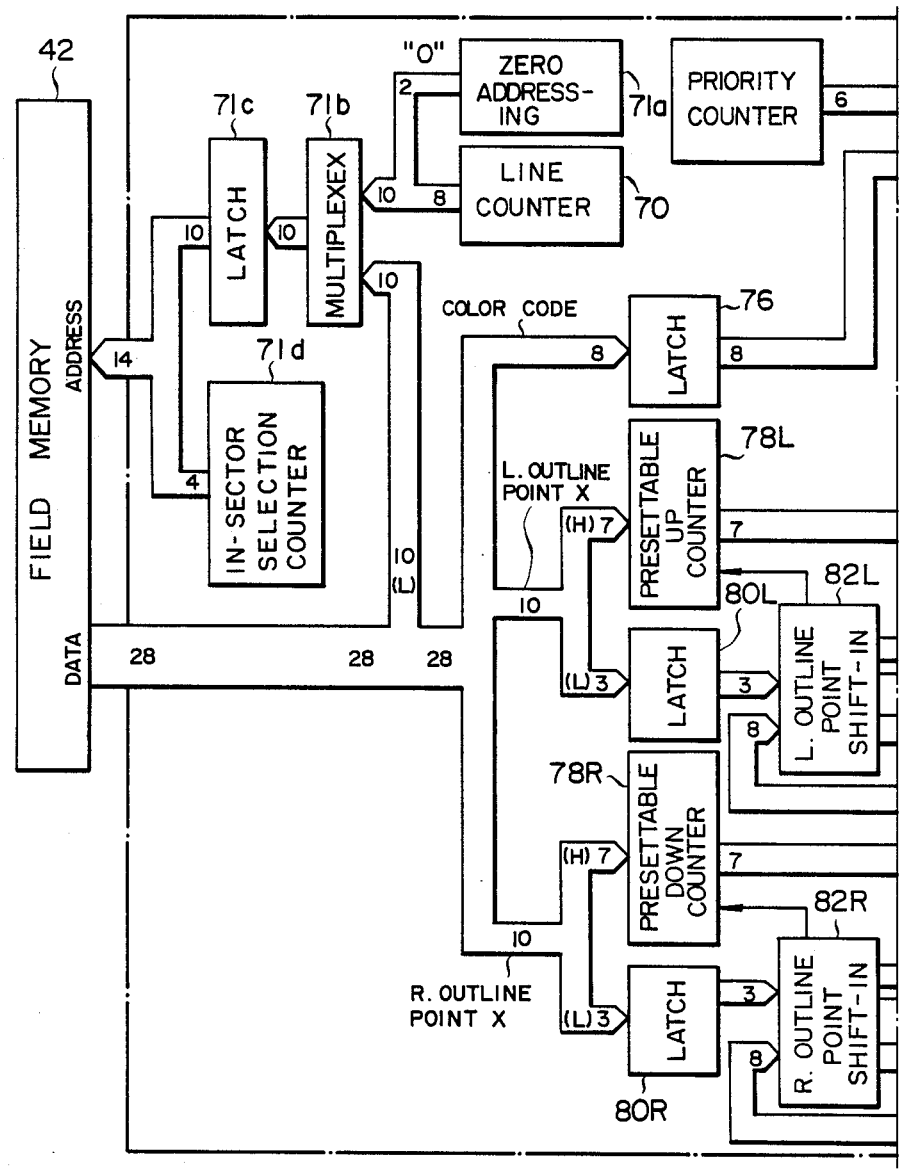
FIGS. 28,28(A) and (B), 29,29(A) and (B) illustrate a line processor circuit used relative to the field memory shown in FIG. 27.
Figure 28B:
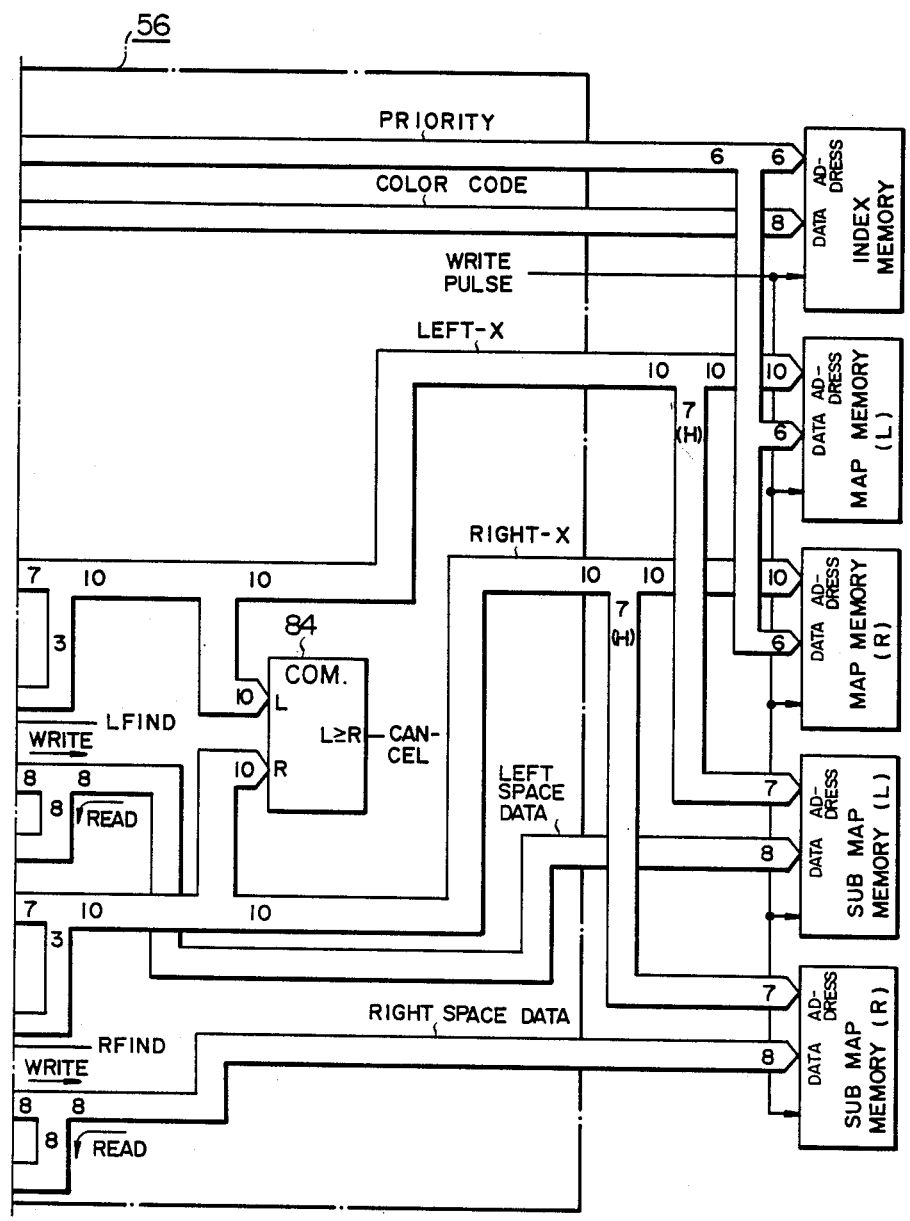
Figures 29, 29A:
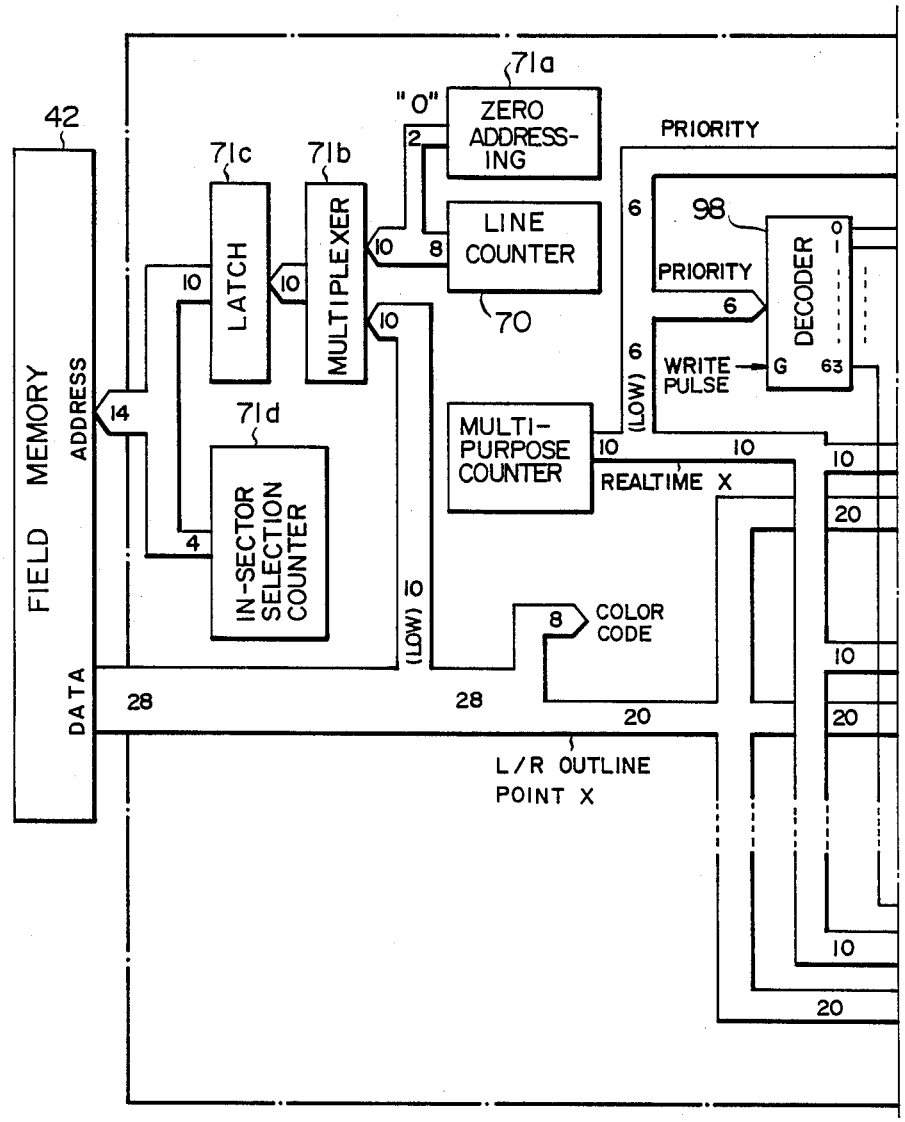
Figure 29B:
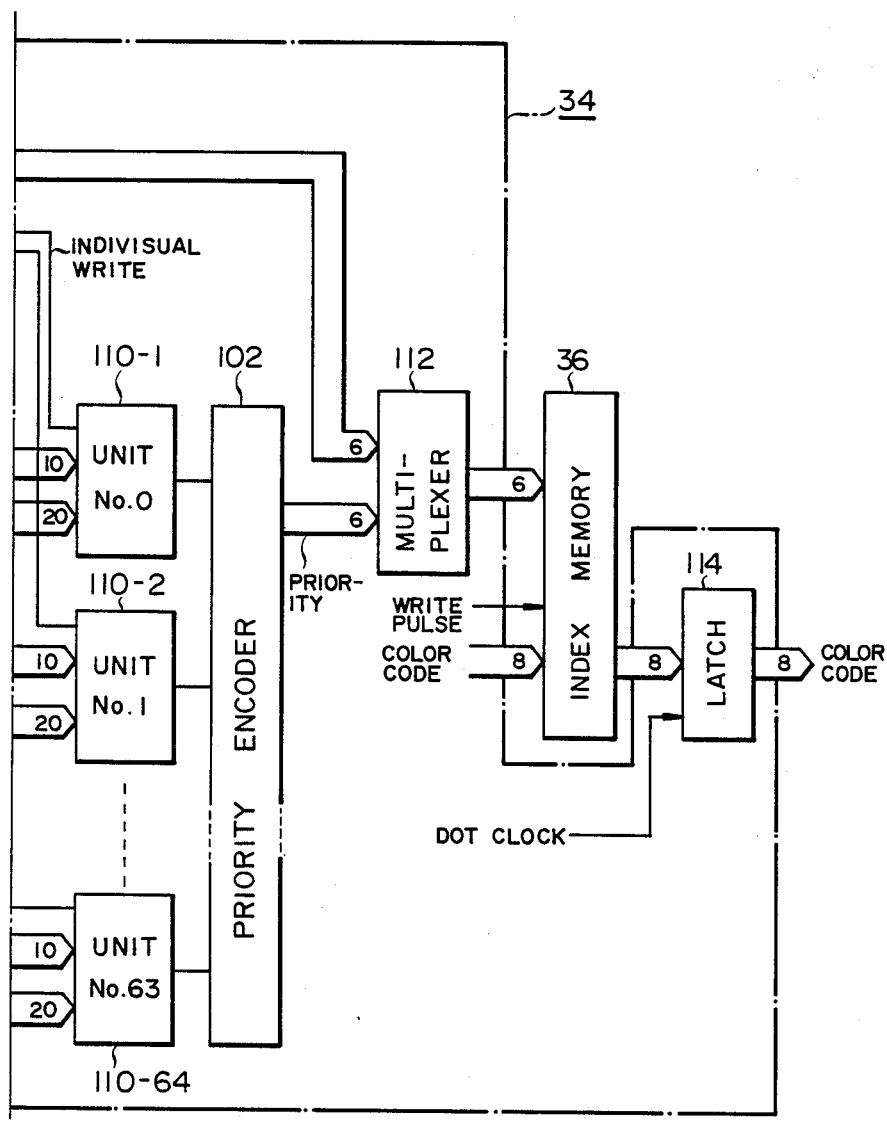

FIGS. 28 and 29 show the constructions of the line processor circuit 34 which is adapted to read the contour point data for such a semi-discontinuous type field memory 42. FIG. 28 depicts a modification of the first line processor 56 in the line processor circuit 34 according to the first concrete example while FIG. 29 denotes a modification of the line processor circuit 34 according to the second concrete example.

Each of these line processor circuits 34 comprises a line counter 70, a zero addressing circuit 71a, a multiplexer 71b, a latch circuit 71c and a select-in-sector counter 71d.

The semi-discontinuous type field memory 42 has sector addresses (0 to 1023) each of which is addressed by the high order 10 bits in a read address from the latch circuit 71c.

In this concrete example, the forwardmost sector address in the horizontal scan memory area corresponding to a horizontal scan line is outputted from the line counter 70 and zero addressing circuit 71a in synchronism with one horizontal scan in CRT.

Read word addressing signals in the specified sectors are then outputted sequentially from the select-in-sector counter 71d.

The respective one of the sectors includes 16 words. Thus, the select-in-sector counter 71d is adapted repeatedly to provide the total number of word addresses equal to 16 corresponding to words ranged between 0 and 15.

On initiation of a horizontal scan, the select-in-sector counter 71d is set at "0". The latch circuit 71c is adapted to output sector addresses and also to update its memory contents only when the select-in-sector counter 71*d* is just set at "0". The multiplexer 71*b* is adapted to select the output of the line counter 70 and "0" in two bits of the zero address.

The line counter 74 is set at "0" on initiation of the field scan.

Reading operation for the horizontal scan memory areas will be performed in the following manner.

It is first assumed that on initiation of the horizontal scan, the line counter 70 outputs a select signal m for a horizontal scan memory area corresponding to a scan line m.

The output m of the line counter 70 is added by "0" in two bits to form a signal which in turn is read by the latch 71*c* through the multiplexer 71*b* and outputted as a sector address.

At the same time, the select-in-sector counter 71*d* is cleared to "0". As a result, 14-bit address 16*m* will be applied to the address input of the field memory 42. This address is the forwardmost one in the horizontal scan memory area corresponding to the scan line m. Therefore, first contour point data is read from the field memory 42.

On each termination of the processing of the contour point data, subsequently, the select-in-sector counter 71*d* is counted up as shown by 1, 2, ... 14 to read the second to fifteenth contour point data while maintaining the sector addresses outputted from the latch circuit 71*c*.

As the output of the select-in-sector counter 71*d* reaches a value equal to 15, "next sector address" is read from the field memory 42 in place of the contour point data and then applied to the input of the latch circuit 71*c* through the multiplexer 71*b*.

When the select-in-sector counter 71*d* is further counted, its output is again set at "0". At the same time, the latch 71*c* outputs the next sector address.

Thus, the contour point data are continuously read in the sector. On termination of the reading of one sector, however, the contour point data are read one after another with reference to the "next sector address".

The read operation is continued until a termination code is detected.

D: Comparison of the Present Invention with the Prior Art

Time required to perform the data processing when an image is to be displayed will now be described in comparison of the image composing apparatus according to the present invention with the prior art bit-map-display system.

Conditions in Comparison

Figure 30:
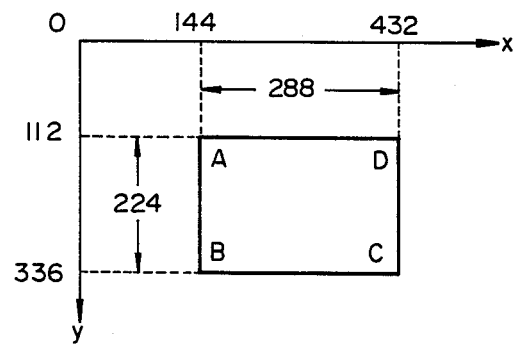
FIG. 30 illustrates a displayed image used in the comparison of data between the present invention and the prior art.

FIG. 30 shows a rectangular pattern which is to be displayed respectively by the use of the image composing apparatus according to the present invention and the prior art bit-map-display system. To simplify an operation of comparing data, the comparison process will be carried out under the following conditions:

Processing Time $\tau$ in the Field Processor Circuit

In order to draw the rectangular contour of FIG. 30, it is assumed that the same field processor circuit is used in the invention apparatus and the prior art system.

To simplify the conditions, it also is assumed that pipeline and/or parallel processings will not be performed in the interior of the field processor circuit. In such a case, the processing time in the field processor circuit will be the sum of time required to process the following three items;

a: Readout of apex coordinate;
b: Division; and
c: Drawing Line.

These processing times will be described below.

Processings for division and drawing line will not be performed with two sides DC and DA of the pattern shown in FIG. 30 since they are parallel to X-axis.

a: Readout of apex coordinate

As described in connection with the aforementioned embodiments, coordinates of one apex are stored in the communication memory 28 at two words. The rectangular pattern of FIG. 30 requires eight words to be read since it has four apexes.

Since the readout of one word requires a cycle of 3 MHz clock (more accurately, 3.072 MHz), time $\tau_{f1}$ required in the readout is given by the following equation:

$$\begin{aligned} \tau_{f1} &= 325.5 \times 8 \\ &= 2604 \text{ (ns)} \\ &= 2.6 \text{ (}\mu\text{s)}. \end{aligned}$$

b: Division

As in the aforementioned embodiments, X-axis coordinate is represented by 12 bits and Y-axis coordinate is indicated by 11 bits.

A division circuit is provided to generate an output of such a type that a calculation result includes "integral quotient part" and "residual part".

The "integral quotient part" includes 12 bits as divided. Therefore, the division requires 12 clock times.

When the division circuit is initialized by adding one clock, one division requires 13 clock times.

It is assumed herein that said clock is one having 6 MHz (more accurately, 6.144 MHz).

As a result, to display said rectangular form will be accomplished by performing two divisions except those of the two sides BC and DA. The processing time $\tau_{f2}$ is given by the following equation:

$$\begin{aligned} \tau_{f2} &= 81.4 \times 13 \times 2 \\ &= 2116.4 \text{ (ns)} \\ &= \text{about } 2.1 \text{ (}\mu\text{s)}. \end{aligned}$$

c: Drawing Line

There will now be studied time required to draw the sides AB and CD.

If it is assumed that one cycle of 6 MHz clock is required for the drawing line of one Y-axis coordinate, the processing time required therein is given by the following equation:

$$\begin{aligned} \tau_{f3} &= 162.8 \times 224 \times 2 \\ &= 72934.4 \text{ (ns)} \\ &= \text{about } 72.9 \text{ (}\mu\text{s)}. \end{aligned}$$

On summing the processing times described from a to c, the total processing time in the field processor circuit is given by the following equation:

$$\tau_f = \tau_{f1} + \tau_{f2} + \tau_{f3} = 77.6 \text{ (}\mu\text{s)}.$$

Processing Time $\tau$ h required in the image composing

The processing time $\tau h$ required in the image composing apparatus according to the present invention is basically given by the processing time $\tau_f$ in the field processor circuit added by the write time into the field memory 42 ($\tau h'$).

To display said rectangular pattern, contour point pairs equal to $112 = 224/2$ (for interrace) will be written into the field memory 42.

As described, the field memory 42 has been cycle stolen with 3 MHz clock. Therefore, its write time $\tau h'$ coresponds to 112 cycle times of 3 MHz clock.

As a result, the write time into the field memory 42 will be given by the following equation:

$$\begin{aligned}\tau h' &= 162.8 \times 112 \\ &= 18233.6 \text{ (ns)} \\ &= \text{about } 18.2 \text{ } (\mu s).\end{aligned}$$

Therefore, the processing time h of the present invention will be given by the following equation:

$$\tau = \tau_f + \tau h' = 97.6 \text{ (ns)}.$$

Processing Time of the Prior Art Bit-Map-Display

As described, the present invention utilizes 8-bit color codes. Matching this, it is assumed that the prior art bit-map-display system also is subjected to the same calculation as in the present invention.

Consequently, the prior art bit-map-memory will have 8 bits assigned to one pixel.

The field memory 42 of the present invention includes, as a rule, 28 bits per word. Therefore, the prior art bit-map-memory should have the number of bits/word equal to or larger than 28 bits.

It is therefore assumed that the prior art bit-map-memory has the number of bits equal to $32 = 8 \times 4$ such that data corresponding to 4 pixels can be written into the memory at a time.

In association with the bit-map-memory, a field processor circuit of the prior art system is such that when one contour point pair is outputted therefrom, the field processor circuit is temporally stopped and held in stand-by until an area between the opposite contour points of the bit-map-memory is filled with given color codes.

Such an operation will be repeated 112 times to form a complete image.

It is assumed herein that the prior art bit-map-memory is cycle stolen with 3 MHz clock as in the field memory of the present invention.

The rectangular pattern shown in FIG. 30 includes 228 pixels per contour point pair. As described, the prior art system also is such that data corresponding to four pixel may be written at a time.

Therefore, the prior art system will be subjected to the number of write operations equal to $72 = 288/4$ for one contour point pair.

As a result, time required to write the rectangular pattern shown in FIG. 30 into the bit-map-memory ($\tau p'$) will be given by the following equation:

$$\begin{aligned}\tau p' &= 162.8 \times 72 \times 112 \\ &= 1312819.2 \text{ (ns)} \\ &= \text{about } 1312.8 \text{ } (\mu s).\end{aligned}$$

Therefore, the processing time in the prior art bit-map-display will be given by the following equation:
$$\tau p = \tau_f + \tau_{p'} = 1390.4 \text{ (ns)}.$$

Comparison

Comparing the processing time $\tau h$ of the present invention with the processing time p of the prior art, therefore, the result will be represented by the following equation:

$$\tau h / \tau p \times 100 = 97.6/1390.4 \times 100 = 5.7 \text{ (\%)}.$$

According to this result, the present invention can process signals through a period of time equal to about 5.7% relative to that of the prior art bit-map-display.

In accordance with the present invention, therefore, the image signal composing and outputting operation can be performed at a speed very higher than that of the prior art bit-map-display and further compose more complicated images substantially in real-time.

As will be apparent from the foregoing, the present invention can provide an image composing apparatus which can compose image signals without need of any fill area operation for the attendant data. Therefore, the image signals can be composed substantially in real-time without increase of the whole size of the apparatus.

I claim:

1. An image composing apparatus for real-time composing and outputting image signals for CRT display, based on contour point data of a given pattern, said apparatus comprising:

contour point data memory means including horizontal scan memory areas respectively corresponding to horizontal scan lines, said horizontal scan memory areas for storing contour point data sequentially written therein depending on their priorities, said contour point data comprising pairs of right- and left-hand contour points at each of which the contour line of a given pattern for CRT display intersects each of the horizontal scan lines and attendant data of said pattern;

an index memory synchronizing with a horizontal scan signal for reading the attendant data included in each of the contour point data from a horizontal scan memory area corresponding to a vertical scan location of said horizontal scan signal, said read attendant data being written and stored in each address of said index memory according to its priority; and readout address generating means synchronizing with the horizontal scan signal for sequentially reading the contour point pairs included in each of the contour point data from the horizontal scan memory area corresponding to a vertical scan location of said horizontal scan signal, the read address of the corresponding attendant data being outputted to said index memory depending on its priority when the horizontal scan is being performed within an area specified by each of the contour point 2. An image composing apparatus as defined in claim 1 wherein said contour point data memory means includes a field memory having a plurality of horizontal scan memory areas corresponding to horizontal scan lines and wherein the inputted contour point data are written and stored in the corresponding one of said horizontal scan memory areas sequentially in accordance with its priority.

3. An image composing apparatus as defined in claim 2 wherein said field memory and line buffer are made up of a dual-port RAM which is alternately subjected to data read-in and read-out.

4. An image composing apparatus as defined in claim 2 wherein said field memory comprises a reference memory space in which a plurality of reference words are provided corresponding to the horizontal CRT scan lines in one-to-one proportion, a float memory space in which a plurality of float words are provided, each of the words in said memory spaces including columns for attendant data, left-hand contour points, right-hand contour points and a next address specifying column, and a complete discontinuous type memory being such that in synchronism with the horizontal CRT scan, a word corresponding to a horizontal scan line is first addressed from said reference memory space with the respective columns thereof being respectively written by attendant data, left-hand contour point and right-hand contour point of the calculated contour point data and with the column for specifying the next address being written the first free word in said float memory space as a write address for the next contour point data and such that the attendant data, left-hand contour point and right-hand contour point of the next contour point data are written in the respective columns of a specified word in said float memory space while the next free word in said float memory space is written in the next address specifying column thereof as a write address for the next contour point address and such that when the calculation and write of the contour point data on said horizontal scan lines are terminated, a termination code is written in a column for specifying an address next to the word present in such a termination.

5. An image composing apparatus as defined in claim 2 wherein said field memory comprises a reference memory space including a plurality of reference word rows and a float memory space including a plurality of float word rows, each of said reference word rows and each of said float word rows including a plurality of write words each of which has columns used to write attendant data, left-hand contour point and right-hand contour point as a word unit and a final word including an address column in which a write termination code or a free word row in said float memory space is to be written, and a semi-discontinuous type memory being such that in synchronism with the horizontal CRT scan, a given word row in said reference memory space is specified corresponding to a horizontal scan line and such that attendant data, left-hand contour point and right-hand contour point of the calculated contour point data are sequentially written in the respective write words in said specified word row, said semi-discontinuous type memory further being arranged so that when the number of calculated contour point data is equal to or less than the number of write words in the specified word row, a termination code is written into the final word in the same word row and that when the number of the calculated contour point data exceeds the number of write word in the specified reference word row, the first free word row in the float memory space is written in the final word as a write address for the next contour point data and the remaining contour point data are written into each of write words in said float memory space.

6. An image composing apparatus as defined in claim 1 wherein said contour point data memory means comprises a field memory and an attendant data memory, said field memory including horizontal scan memory areas at each of which a contour point pair and a pattern recognition number are written in said field memory, said attendant data memory for writing and storing the attendant data using the pattern recognition number as an address.

7. An image composing apparatus as defined in claim 1 wherein said readout address generating means comprising:
a first line processor synchronizing with a horizontal scan signal for reading contour point data from a horizontal scan memory area corresponding to the vertical scan location of said horizontal scan signal in accordance with the priority of said contour point data and for generating the priority number of each of said contour point pairs;
a contour point map memory for utilizing left- and right-hand contour point positions included in the contour point data as addresses such that said priority number and contour point positions can be written and stored in said contour point map memory; and
a second line processor for outputting a readout address to said index memory in accordance with its corresponding priority number when the horizontal scan is made within an area specified by the contour point pair written into said contour point map memory;
and wherein said index memory is formed to write and store the attendant data read by said first line processor sequentially at each of the addresses in accordance with its priority number and to output the written attendant data sequentially in accordance with the readout address outputted from said second line processor, whereby image signals for horizontal scan can be real-time composed and outputted from said apparatus sequentially based on the contour point data of each of given patterns.

8. An image composing apparatus as defined in claim 7 wherein said contour point map memory comprises:
a map memory for utilizing left- and right-hand contour point positions included in the contour point data as addresses to write and store said priority number; and
a sub-map memory into which the contour point positions included in the contour point data are written and stored.

9. An image composing apparatus as defined in claim 8 wherein said first line processor comprises a left-hand contour point shifting circuit arranged such that when the contour point data relating to a plurality of polygons are continuously read out and if left-hand contour points in said polygons are at the same address, the display of a polygon having its higher priority will not be prevented by shifting the left-hand contour point of a polygon having its lower priority to a predetermined direction, and a right-hand contour point shifting circuit arranged such that when the contour point data relating to a plurality of polygons are continuously read out and if right-hand contour points in said polygons are at the same address, the display of a polygon having its higher prioriyt will not be prevented by shifting the right-hand contour point of a polygon having its lower priority to a predetermined direction, the shifted contour points being written and stored in said sub-map memory.

10. An image composing apparatus as defined in claim 8 wherein said map memory comprises two map memories which are respectively exclusive for left-hand right-hand contour points, said two map memories for superposing left- and right-hand contour points in different polygons one above another.

11. An image composing apparatus as defined in claim 10 wherein said sub-map memory comprises two sub-map memories which are respectively exclusive for left- and right-hand contour points, said two sub-map memories for superposing left- and right-hand contour points in different polygons one above another.

12. An image composing apparatus as defined in claim 8 wherein said second line processor comprises:
   a counter for outputting horizontal scan position signals of CRT as addresses used to read data from the left-hand contour point map memory, right-hand contour point map memory, left-hand contour point sub-map memory and right-hand contour point sub-map memory;
   a plurality of flip flops, one for each of polygons displayable on one horizontal scan line, and arranged in the order starting from the highest priority;
   a left-hand contour point decoder for discriminating that the priority number of a left-hand contour point read from the left-hand contour point map memory is effect only when a signal representative of the left-hand contour point being written is read from the left-hand contour point sub-map memory, said decoder for setting a flip flop specified by said priority number;
   a right-hand contour point decoder for discriminating that the priority number of a right-hand contour point read from the right-hand contour point map memory is effective only when a signal representative of the right-hand contour point read from the right-hand contour point map memory is effective only when a signal representative of the right-hand contour point being written is read from the right-hand contour point sub-map memory, said decoder for resetting a flip flop specified by said priority number; and
   a priority encoder for applying, as an attendant data readout address, the priority number corresponding to a flip flop having the highest priority among the flip flops being in their set state to said index memory, based on the outputs of said flip flops.

13. An image composing apparatus as defined in claim 7 wherein said first line processor comprises a line counter synchronizing with the horizontal scan on CRT to otuput a selection signal relative to the corresponding scan line and a priority number counter for generating priority numbers in the order starting from zero in number, the outputs from said counters being supplied to said field memory so that the contour point data specified by the respective one of generated priority numbers are read out from a horizontal scan memory area specified by the corresponding one of the outputted selection signals.

14. An image composing apparatus as defined in claim 1 wherein said readout address generating means comprises data reading means synchronizing with a horizontal scan signal for reading the contour point data from a horizontal scan memory area corresponding to a vertical scan location of said horizontal scan signal sequentially in accordance with the priority of said contour point data and for generating a priority number corresponding to said contour point data, and address output means for storing the contour point pairs included in the read contour point data sequentially in accordance with their priorities and for outputting a readout address to said index memory in accordance with the highest priority number relative to said contour point pairs when the horizontal scan is being made within an area specified by each of the stored contour point pairs and wherein index memory is such that the attendant data included in the contour point data read out by said data reading means are written and stored in said index memory at the respective one of addresses sequentially in accordance with the priority number and such that the written attendant data are outputted from the index memory sequentially in accordance with the readout addresses from said address outputting means, whereby horizontal scan image signals can be real-time composed and outputted from said apparatus sequentially based on the contour point data of each of given patterns.

15. An image composing apparatus as defined in claim 14 wherein said data reading means comprises a line counter synchronizing with a horizontal CRT scan to output a select signal relative to the corresponding one of horizontal scan lines and a counter for sequentially generating priority numbers, whereby said data reading means can read the contour point data specified by a priority number froma horizontal scan memory specified by said select signal, the attendant data included in the read contour point data in turn being written and stored in said index memory sequentially by using said priority number as an address and wherein said address generating means comprises a plurality of unit circuits, one for each of polygons displayable on one horizontal scan line, and for being addressed by priority numbers, each of said unit circuits for being written a contour point pair included in the contour point data read from the field memory at an address corresponding to its priority number and to output an H-level signal only when a horizontal CRT scan location is within a range of the written contour point pair, and a priority encoder for previously assigning a priority number to each of said unit circuits and for selecting a unit circuit having the highest priority among the unit circuits from which H-level signals have been outputted, the priority number of the selected unit circuit being then applied to said index memory as a readout address, whereby the attendant data specified by said priority number can be outputted from the index memory.

16. An image composing apparatus as defined in claim 15 wherein each of said unit circuits comprises:
   a pair of left- and right-hand contour point registers in which X-axis coordinates of left- and right-hand contour points read from said field memory are respectively written;
   a pair of lef- and right-hand coincidence detecting circuits corresponding to said pair of registers for outputting set and reset signals when a horizontal CRT scan position is respectively coincident with the left- and right-hand contour point X-axis coordinates stored in said registers; and
   a flip flop supplying an H-level signal to said priority encoder at the same time as a set signal is outputted and for stopping the output of H-level signal at the same time as a reset signal is outputted.

17. An image composing apparatus as defined in claim 15 wherein each of said unit circuits comprises:
- a pair of left- and right-hand contour point down counters in which X-axis coordinates of left- and right-hand contour points read from the field memory are written as initial values, each of said down counters for making a down counting at each time when the horizontal CRT scan is performed by one dot;
- a pair of left- and right-hand zero detection circuits for outputting a set signal when the output of said left-hand contour point down counter becomes zero and for outputting a reset signal when the output of the right-hand contour point down couter becomes zero; and
- a flip flop for supplying an H-level signal to said priority encoder at the same time as the set signal is inputted in said flip flop and for stopping the output of the H-level signal at the same time as the reset signal is inputted in said flip flop.

18. An image composing apparatus as defined in claim 1 further comprising a source of image data for handling and processing three-dimensional data to convert three-dimensional data to be displayed into a combination of two-dimensional pattern data which in turn is outputted as pseudo three-dimensional data, and a field processor circuit for calculating the contour of each of patterns to be displayed on CRT based on said psedo three-dimensional data from said source of image data and for outputting left- and right-hand contour point pairs at which the contour of the calculated pattern intersects horizontal scan lines and the attendant data corresponding to said contour point pairs to the contour point data memory means as contour point data relating to the corresponding pattern.

19. An image composing apparatus as defined in claim 18 wherein said source of image data for converting a three-dimensional object to be displayed into a combined data of two-dimensional polygons, which combined data in turn are outputted as pseudo three-dimensional data.

20. An image composing apparatus as defined in claim 18 further comprising a communication memory between said source of image data and said field processor circuit for receiving polygon data from said source of image data and outputting said polygon data to said field processor circuit in the order starting from the highest priority.

* * * * *